US009363359B2

(12) United States Patent
Mhun et al.

(10) Patent No.: US 9,363,359 B2
(45) Date of Patent: Jun. 7, 2016

(54) MOBILE TERMINAL AND METHOD FOR CONTROLLING THE SAME

(75) Inventors: Yunjueng Mhun, Seoul (KR); Jaeho Choi, Seoul (KR); Yeonsuk Na, Seoul (KR); Jian Choi, Seoul (KR); Joohee Son, Seoul (KR); Yunmi Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 13/546,947

(22) Filed: Jul. 11, 2012

(65) Prior Publication Data

US 2013/0072262 A1 Mar. 21, 2013

(30) Foreign Application Priority Data

Sep. 16, 2011 (KR) ........................ 10-2011-0093539

(51) Int. Cl.

| | |
|---|---|
| ***G06F 3/14*** | (2006.01) |
| ***H04M 1/725*** | (2006.01) |
| ***G06F 3/0488*** | (2013.01) |
| ***G06F 3/0481*** | (2013.01) |
| ***G06F 3/0486*** | (2013.01) |

(52) U.S. Cl.

CPC ......... *H04M 1/72552* (2013.01); *G06F 3/0481* (2013.01); *G06F 3/0486* (2013.01); *G06F 3/04883* (2013.01); *G06F 3/04886* (2013.01); *H04M 1/72583* (2013.01); *G06F 2200/1614* (2013.01); *G06F 2203/04803* (2013.01)

(58) Field of Classification Search

CPC ... H04L 51/04; H04L 12/581; H04L 12/5835; H04L 67/02; H04L 51/046; G06F 1/1647; G06F 1/1656; G06F 3/0486

See application file for complete search history.

(56) References Cited

U.S. PATENT DOCUMENTS

| | | | | |
|---|---|---|---|---|
| 2004/0054646 | A1 * | 3/2004 | Daniell et al. | 707/1 |
| 2005/0021652 | A1 * | 1/2005 | McCormack | 709/207 |
| 2005/0060656 | A1 * | 3/2005 | Martinez et al. | 715/751 |
| 2007/0288560 | A1 * | 12/2007 | Bou-Ghannam et al. | 709/204 |
| 2010/0037167 | A1 * | 2/2010 | Son et al. | 715/769 |
| 2010/0087230 | A1 * | 4/2010 | Peh et al. | 455/566 |
| 2010/0229088 | A1 * | 9/2010 | Nakajima et al. | 715/702 |
| 2010/0267369 | A1 * | 10/2010 | Lim et al. | 455/414.1 |
| 2010/0285844 | A1 | 11/2010 | Hosoi et al. | |
| 2011/0179372 | A1 | 7/2011 | Moore et al. | |
| 2013/0055099 | A1 * | 2/2013 | Yao et al. | 715/739 |

FOREIGN PATENT DOCUMENTS

| | | |
|---|---|---|
| EP | 2175355 | 4/2010 |
| WO | 2009/142468 | 11/2009 |

OTHER PUBLICATIONS

European Patent Office Application Serial No. 12184147.2, Search Report dated Dec. 7, 2012, 10 pages.

* cited by examiner

*Primary Examiner* — Quan M Hua

(74) *Attorney, Agent, or Firm* — Lee Hong Degerman Kang & Waimey; Jonathan Kang; Jeffrey Lotspeich

(57) ABSTRACT

A mobile terminal and a method of controlling the same are provided. In a state where a message application is executed, when a view mode of the mobile terminal is converted to a landscape view mode, the mobile terminal displays at least one selectable item related to the message application in a partial area of a screen.

16 Claims, 42 Drawing Sheets

100 A2 A1 Contacts 151 CL1 A AAA AAB AAC B BBB BBC C CCC (a)

100 A2 A1 AAA Contacts 151 CL1 MW1 A AAA AAB AAC B BBB BBC C CCC + Send (b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND METHOD FOR CONTROLLING THE SAME

CROSS-REFERENCE TO RELATED APPLICATION

Pursuant to 35 U.S.C. §119(a), this application claims benefit of earlier filing date and right of priority to Korean Patent Application No. 10-2011-0093539, filed Sep. 16, 2011, the contents of which are all hereby incorporated by reference herein in its entirety.

BACKGROUND

1. Field

Embodiments may relate to a mobile terminal and a method of controlling the same.

2. Background

Terminals can be classified into mobile terminals and stationary terminals. The mobile terminals can be classified as handheld terminals or vehicle mounted terminals according to whether users can personally carry the terminals.

In view of a characteristic of mobile terminals, a screen size is limited and thus in order to alternately transmit and receive messages with a plurality of another parties, it is difficult to display a plurality of message windows on one screen.

Further, when alternately transmitting and receiving messages with several another parties, whenever changing another party to transmit and receive messages, it is inconvenient to remove a presently displayed message window from a screen, to select another party to change, and to display again a message window with the selected another party on the screen.

Therefore, in order to alternately transmit and receive messages with several another parties using a mobile terminal, it is considered to improve a structural portion and/or a software portion of the terminal.

SUMMARY

An aspect of the present invention is to provide a mobile terminal and a method of controlling the same that can improve convenience of a user transmitting and receiving messages with a plurality of another parties.

In an aspect, a mobile terminal includes: a wireless communication unit for transmitting and receiving a message with at least one another party; a display module; and a controller for controlling to convert a view mode of the mobile terminal to a landscape view mode when a specific user input is input and controlling the display module to provide a first area in which at least one selectable item related to a message application is displayed and a second area for displaying a message window in which the message is displayed when the view mode of the mobile terminal becomes the landscape view mode in a state where the message application is executed.

In another aspect, a method of controlling a mobile terminal, the method includes: executing a message application; providing, if a view mode of the mobile terminal is a landscape view mode, a first area for displaying at least one selectable item related to the message application and a second area for displaying a message window for displaying a message transmitted and received with at least one another party; and performing, if one of at least one item is selected, a function related to the selected item or a function using the item among functions of the message application.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

DETAILED DESCRIPTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, a mobile terminal according to embodiments of the present invention will be described below in more detail with reference to the accompanying drawings. In the following description, the suffixes "module" and "unit" are used in reference to components of the mobile terminal for convenience of description and do not have meanings or functions different from each other.

The mobile terminals described herein may include a cellular phone, a smart phone, a laptop computer, a digital broadcasting terminal, a personal digital assistant (PDA), a portable multimedia player (PMP), and a navigation system.

Figure 1:
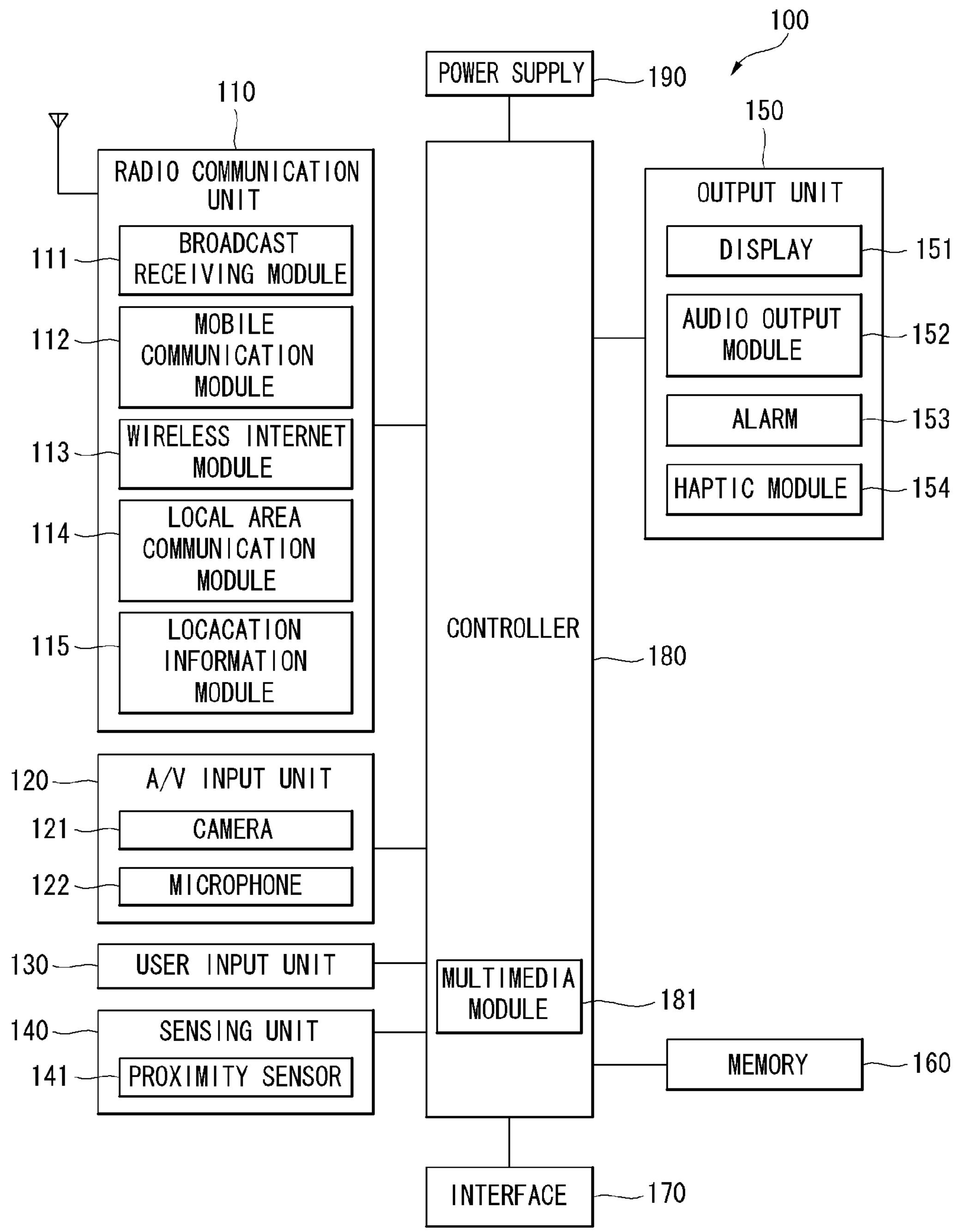
FIG. 1 is a block diagram illustrating a configuration of a mobile terminal according to embodiments of the present invention.

FIG. 1 is a block diagram of a mobile terminal 100 according to an embodiment of the present invention. It is understood that other embodiments, configurations and arrangements may also be provided. With reference to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 are essential, and the number of components included in the mobile terminal 100 may be varied. The components of the mobile terminal 100, as illustrated with reference to FIG. 1 will now be described.

The wireless communication unit 110 may include at least one module that enables wireless communication between the mobile terminal 100 and a wireless communication system or between the mobile terminal 100 and a network in which the mobile terminal 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro™), world interoperability for microwave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or ZigBee™ may be used as a local area communication technique.

The position-location module 115 may confirm or obtain the position of the mobile terminal 100. The position-location module 115 may obtain position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving pictures obtained by an image sensor in a video call mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the mobile terminal 100 from a user. The user input unit 130 may include a keypad, a dome switch, a touch pad (e.g., constant voltage/capacitance), a jog wheel, and a jog switch.

The sensing unit 140 may sense a current state of the mobile terminal 100, such as an open/closed state of the mobile terminal 100, a position of the mobile terminal 100, whether a user touches the mobile terminal 100, a direction of the mobile terminal 100, and acceleration/deceleration of the mobile terminal 100, and generate a sensing signal required for controlling the mobile terminal 100. For example, if the mobile terminal 100 is a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UI) or a graphic user interface (GUI) related to a voice call when the mobile terminal 100 is in the call mode. The display module 151 may also display a captured and/or received image and a UI or a GUI when the mobile terminal 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the mobile terminal 100 through the transparent portion of the display unit 151 on the body of the mobile terminal 100.

The mobile terminal 100 may also include at least two display modules 151. For example, the mobile terminal 100 may include a plurality of display modules 151 that are arranged on a single face of the mobile terminal 100 and spaced apart from each other at a predetermined distance or that are integrated together. The plurality of display modules 151 may also be arranged on different sides of the mobile terminal 100.

Further, when the display module 151 and a touch-sensing sensor (hereafter referred to as a touch sensor) form a layered structure that is referred to as a touch screen, the display module 151 may be used as an input device in addition to an output device. The touch sensor may be in the form of a touch film, a touch sheet, or a touch pad, for example.

The touch sensor may convert a variation in pressure, applied to a specific portion of the display module 151, or a variation in capacitance, generated at a specific portion of the display module 151, into an electric input signal. The touch sensor may sense pressure, position, and an area (or size) of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense the presence of an object approaching a predetermined sensing face or an object located near the proximity sensor using an electromagnetic force or infrared rays without mechanical contact. The proximity sensor 141 may have a lifetime longer than a contact sensor and may thus be more appropriate for use in the mobile terminal 100.

The proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be considered as a proximity sensor 141.

For the convenience of description, an action in which a pointer approaches the touch screen without actually touching the touch screen may be referred to as a proximity touch, and an action in which the pointer is brought into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the mobile terminal 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the mobile terminal 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The mobile terminal 100 may also include a plurality of haptic modules 154.

The memory 160 may store a program for operating the controller 180 and temporarily store input/output data such as a phone book, messages, still images, and/or moving pictures. The memory 160 may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The mobile terminal 100 may also operate in association with a web storage performing the storage function of the memory 160 on the Internet.

The interface unit 170 may serve as a path to external devices connected to the mobile terminal 100. The interface unit 170 may receive data or power from the external devices, transmit the data or power to internal components of the mobile terminal 100, or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identity module (UIM), a subscriber identity module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are provided to the mobile terminal 100. The various command signals or power input from the cradle may be used as signals for checking whether the mobile terminal 100 is correctly settled (or loaded) in the cradle.

The controller 180 may control overall operations of the mobile terminal 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images. The power supply 190 may receive external power and internal power and provide power required for operating the components of the mobile terminal 100 under the control of the controller 180.

According to a hardware implementation, embodiments of the present invention may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
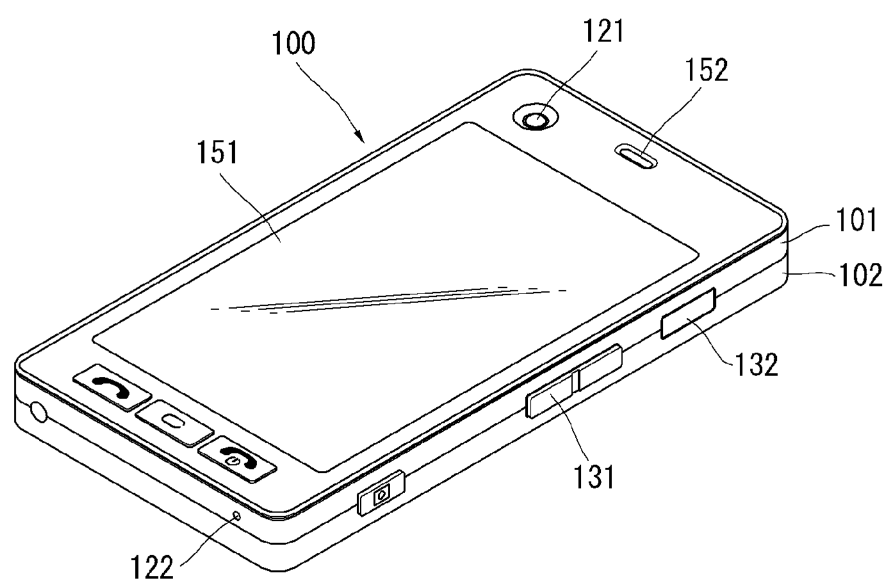
FIG. 2 is a front perspective view illustrating a mobile terminal according to exemplary embodiments of the present invention.

FIG. 2 is a front perspective view of a mobile terminal or a handheld terminal 100 according to an embodiment of the present invention. The handheld terminal 100 has a bar type terminal body. However, embodiments of the present invention are not limited to a bar type terminal and may include various types of terminals such as slide type, folder type, swing type and swivel type terminals having at least two bodies coupled such that they can move relative to each other.

The terminal body includes a case (a casing, a housing, or a cover) forming the exterior of the terminal 100. In the embodiment of FIG. 2, the case may be divided into a front case 101 and a rear case 102. Various electronic components are arranged in the space (volume) defined between the front case 101 and the rear case 102. At least one middle case may be additionally arranged between the front case 101 and the rear case 102. The cases may be made of plastics through injection molding or made of a metal material such as stainless steel (STS) or titanium (Ti).

The display module 151, the audio output module 152, the camera 121, user input unit 130 (e.g., operating units 131, 132), the microphone 122 and the interface unit 170 may be arranged in the terminal body, specifically, in the front case 101.

The display module 151 occupies a majority of the area of the main face of the front case 101. The audio output module 152 and the camera 121 are arranged in a region in proximity to an end of the display module 151, and the operating unit 131 and the microphone 122 are located in a region in proximity to the other end of the display module 151. The operating unit 132 and the interface unit 170 are arranged on the lateral sides of the front case 101 and the rear case 102.

The user input unit 130 is operated to receive commands controlling the handheld terminal 100 and may include a plurality of operating units 131 and 132. The first and second operating units 131 and 132 may be referred to as manipulating portions and may employ a tactile mechanism by which a user operates the operating units 131 and 132 by touch.

The first and second operating units 131 and 132 may receive various inputs. For example, the first operating unit 131 receives commands such as 'START,' 'END,' and 'SCROLL,' and the second operating unit 132 receives commands such as 'CONTROL' (the volume of sound output from the audio output module 152) or 'CONVERT' (a mode of the display module 151 into a touch recognition mode).

Figure 3:
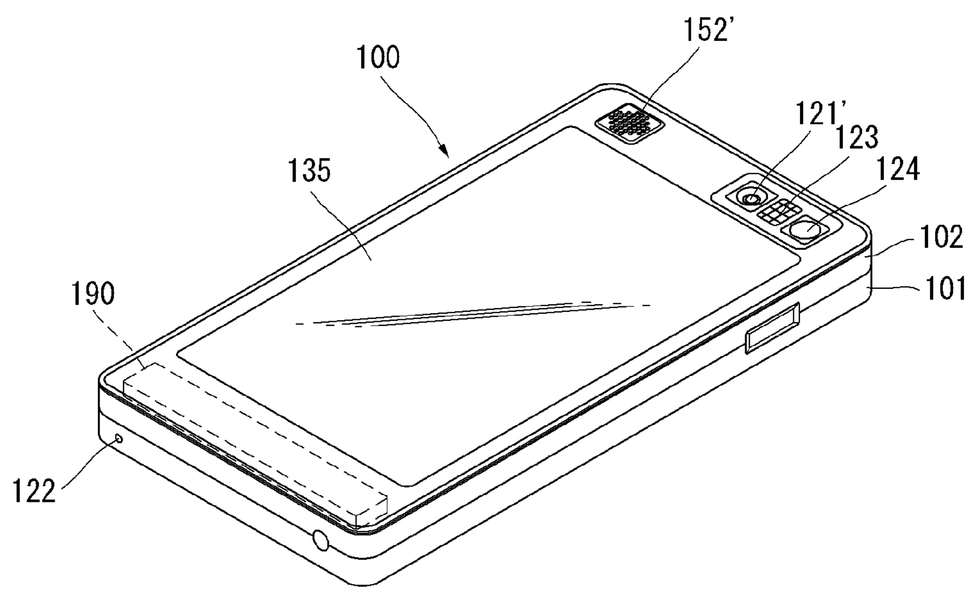
FIG. 3 is a rear perspective view illustrating a mobile terminal according to exemplary embodiments of the present invention.

FIG. 3 is a rear perspective view of the handheld terminal shown in FIG. 2 according to an embodiment of the present invention.

Referring to FIG. 3, a camera 121' may be additionally mounted at the rear side of the terminal body, that is, the rear case 102. The camera 121' captures images along a direction opposite to that of the camera 121 shown in FIG. 2 and may have a pixel resolution different from that of the camera 121.

For example, according to one embodiment, the camera 121 has a relatively low resolution suitable for capturing an image of the face of a user and transmitting the captured image in a video call, while the camera 121' has a relatively high resolution suitable for capturing a photograph of a general subject. The cameras 121 and 121' may be mounted to the terminal body such that they may be rotated or popped-up.

A flash 123 and a mirror 124 may be additionally arranged in proximity to the camera 121'. The flash 123 lights a subject when the camera 121' takes a picture of the subject. The mirror 124 may be used by the user to view his/her face when the user wants to self-photograph himself/herself using the camera 121'.

An audio output module 152' may be additionally provided on the rear side of the terminal body. The audio output module 152' may facilitate a stereo function in conjunction with the audio output module 152 shown in FIG. 2 and may be used in a speaker phone mode when the terminal is used for a voice call.

A broadcasting signal receiving antenna 116 may be additionally attached to the side of the terminal body in addition to an antenna for voice calls. The antenna, which may constitute a part of the broadcast receiving module 111 shown in FIG. 1, may be mounted in the terminal body such that the antenna may be pulled out from (and retracted into) the terminal body.

The power supply 190 for providing power to the handheld terminal 100 is set in the terminal body. The power supply 190 may be provided in the terminal body or detachably installed on the terminal body.

A touch pad 135 for sensing a touch may be additionally attached to the rear case 102. The touch pad 135 may be of a light transmission type similar to the display module 151. In this configuration, if the display module 151 outputs visual information through both of its sides (or faces), the visual information may be viewable via the touch pad 135. The information output through both sides of the display unit 151 may be controlled by the touch pad 135. Alternatively (or in addition), a display is additionally attached to the touch pad 135 such that a touch screen may be arranged in the rear case 102.

The touch pad 135 operates in connection with the display module 151 of the front case 101. The touch pad 135 may extend parallel to the display module 151 behind the display module 151. The touch panel 135 may have a size equal to or smaller than the size of the display module 151.

Figure 4:
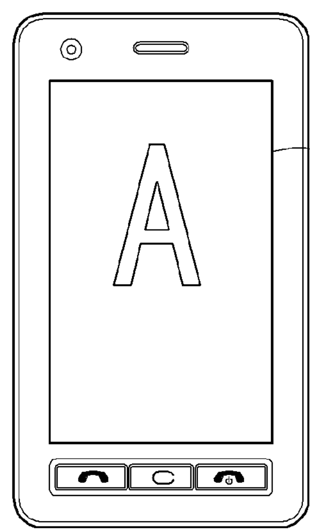
FIG. 4 is a diagram illustrating a view mode of a mobile terminal according to exemplary embodiments of the present invention.
Figure 4:
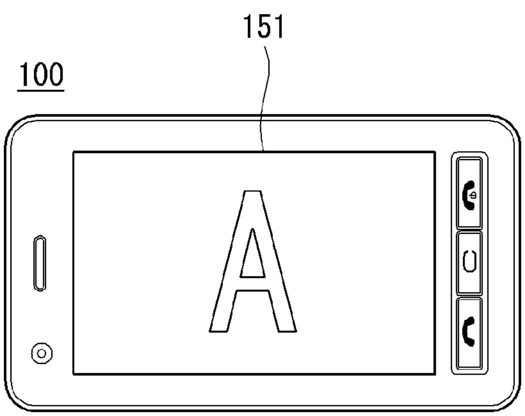

FIG. 4 is a diagram illustrating a view mode of the mobile terminal 100 according to exemplary embodiments of the present invention.

In this document, a view mode of the mobile terminal 100 is classified into a landscape view mode and a portrait view mode according to a screen display direction.

FIG. 4(*a*) illustrates a case where a view mode of the mobile terminal 100 is a portrait view mode, and FIG. 4(*b*) illustrates a case where a view mode of the mobile terminal 100 is a landscape view mode.

As shown in FIG. 4, a screen display direction in a landscape view mode and a screen display direction in a portrait view mode are orthogonal to each other.

In this document, the mobile terminal 100 controls conversion of a view mode based on a control input that is input by a user. A control input that converts a view mode is input as a user rotates the mobile terminal 100 in a specific direction or manipulates a specific key button of the user input unit 130.

Exemplary embodiments disclosed in this document can be embodied in the mobile terminal 100 described with reference to FIGS. 1 to 4.

In this document, it is assumed that the display module 151 is a touch screen 151. As described above, the touch screen 151 can perform both an information display function and an information input function. However, the present invention is not limited thereto.

Further, in this document, a touch gesture is a gesture embodied by a contact touch or a proximity touch of the touch screen 151, and a touch input is an input received by a touch gesture.

The touch gesture is classified into tapping, drag, flicking, press, multi touch, pinch-in, and pinch-out according to an action.

Tapping is an action of lightly pressing one time the touch screen 151 and is a touch gesture such as a click touch of a mouse in a general computer.

Further, a drag is an action of moving a finger to a specific position in a state of touching the touch screen 151, and when dragging an object, a corresponding object may continue to move in a drag direction and be displayed.

Further, flicking is an action of moving in a specific direction (a right side, a left side, an upper side, a lower side, and a diagonal line) and removing a finger after touching the touch screen 151, and when a touch input is received by flicking, the mobile terminal 100 performs a processing of a specific action based on a flicking direction or speed. For example, the mobile terminal 100 may perform operation of turning a page of an e-book based on a flicking direction.

Further, press is an action of continuing to sustain a touch for a preset time period or more after touching the touch screen 151.

Further, a multi touch is an action of simultaneously touching a plurality of points of the touch screen 151.

Further, pinch-in is an action of dragging a plurality of pointers while multi-touching in an approaching direction on the touch screen 151. That is, pinch-in is started from at least one of a plurality of points while multi-touching and is an action of dragging a plurality of points while multi-touching in an approaching direction on the touch screen 151.

Further, pinch-out is an action of dragging a plurality of pointers while multi-touching in a receding direction on the touch screen 151. That is, pinch-out is started from at least one of a plurality of points while multi-touching and is an action of dragging a plurality of points while multi-touching in a receding direction on the touch screen 151.

In this document, for convenience of description, a window for displaying a transmitted and received message is referred to as a ‘message window’. Further, an another user transmitting and receiving a message with a user of the mobile terminal 100 through the wireless communication unit 110 is referred to as ‘another party’ or ‘chat another party’.

In this document, the message may be various forms of messages transmitted and received through the wireless communication unit 110 such as an instant message (IM), a short message service (SMS), a multimedia messaging service (MMS), and an e-mail.

Hereinafter, operation of the mobile terminal 100 for embodying exemplary embodiments disclosed in this document will be described in detail.

The sensing unit 140 includes a gyroscope, an accelerometer, and a magnetic sensor.

The gyroscope acquires a rotation on an axis of the mobile terminal 100, i.e., a rotation speed or an angular velocity according to a rotation of the mobile terminal 100. Further, the accelerometer acquires gravity acceleration according to a motion of the mobile terminal 100. Further, the magnetic sensor acquires an orientation of the mobile terminal 100 like a compass.

The controller 180 acquires a motion of the mobile terminal 100 based on at least one of an angular velocity acquired through a gyroscope of the sensing unit 130, gravity acceleration acquired through an accelerometer, and an orientation of the mobile terminal 100 acquired through a magnetic sensor. Here, a motion of the mobile terminal 100 may include tilting, a horizontal state, and a rotation of the mobile terminal 100.

Further, the controller 180 controls a view mode of the display module 151 to a landscape view mode or a portrait view mode based on a user's control input that is input in various forms.

For example, the controller 180 may acquire a posture of the mobile terminal 100 based on a motion of the mobile terminal 100 acquired through the sensing unit 140 and control a view mode based on a posture of the mobile terminal 100.

Further, for example, the controller 180 may control a view mode of the mobile terminal 100 based on a user's control input that is input through the user input unit 130 such as a manipulation of a specific key button.

The controller 180 controls to display a message window for displaying a message transmitted and received with at least one another party on a screen through the display module 151.

Further, when a view mode of the mobile terminal 100 operates as a landscape view mode while executing a message application, the controller 180 divides a display area into a plurality of areas. Further, the controller 180 controls to display at least one item related to a message application in one area of divided areas.

Here, an item related to the message application may include at least one another party that can be added as chat another party, at least one message window in a presently inactivated state, at least one application that can be executed by interlocking with a message application, at least one contents that can be attached when sending a message, and at least one menu item that can be selected related to a message application.

Hereinafter, a method of controlling the mobile terminal 100 according to an exemplary embodiment of the present invention and operation of the mobile terminal 100 for embodying the same will be described in detail with reference to FIGS. 6 to 46.

Figure 5:
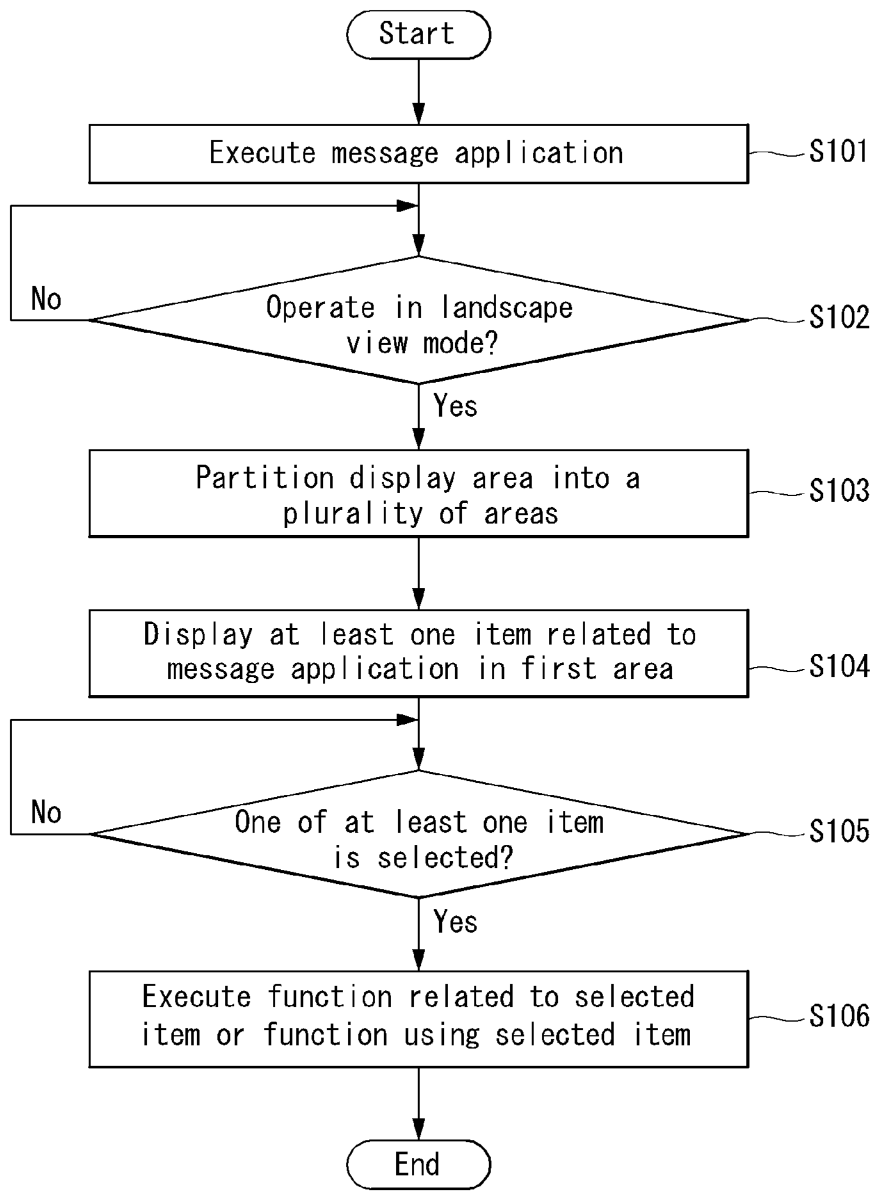
FIG. 5 is a flowchart illustrating a method of controlling a mobile terminal according to an exemplary embodiment of the present invention.

FIG. 5 is a flowchart illustrating a method of controlling the mobile terminal 100 according to an exemplary embodiment of the present invention.

Referring to FIG. 5, the controller 180 executes a message application (S101).

While executing a message application, the controller 180 determines whether the mobile terminal 100 operates in a landscape view mode (S102), and if the mobile terminal 100 operates in a landscape view mode, the controller 180 divides a display area into a plurality of areas (S103).

Further, the controller 180 controls to display at least one selectable item related to a message application in a first area of divided areas and to set a second area as an area in which a message window is displayed (S104). That is, the controller 180 controls to display a selectable item related to a message application in the first area and to display a message window in a presently activation state in the second area or a message window to be generated later.

At step S102, the controller 180 controls conversion to a landscape view mode based on a user input. Here, a user input that requests conversion to a landscape view mode may be input by various methods.

For example, a user input that requests conversion of a view mode of the mobile terminal 100 may be input based on a motion of the mobile terminal 100. That is, when a body of the mobile terminal 100 rotates in a specific direction, the controller 180 receives a user input that requests conversion of a view mode of the mobile terminal 100.

Further, for example, a user input that requests conversion of a view mode of the mobile terminal 100 may be input by manipulation of a specific key button. That is, when a specific key button of the user input unit 130 is manipulated, the controller 180 may receive a user input that requests conversion of a view mode of the mobile terminal 100.

Referring again to FIG. 5, the controller 180 determines whether one of at least one item displayed in the first area is selected (S105), and if one of at least one item displayed in the first area is selected, the controller 180 executes a function related to the selected item, or a function using the selected item (S106).

At step S104, an item displayed in the first area includes at least one chat another party that can be added as chat another party.

Figure 6:
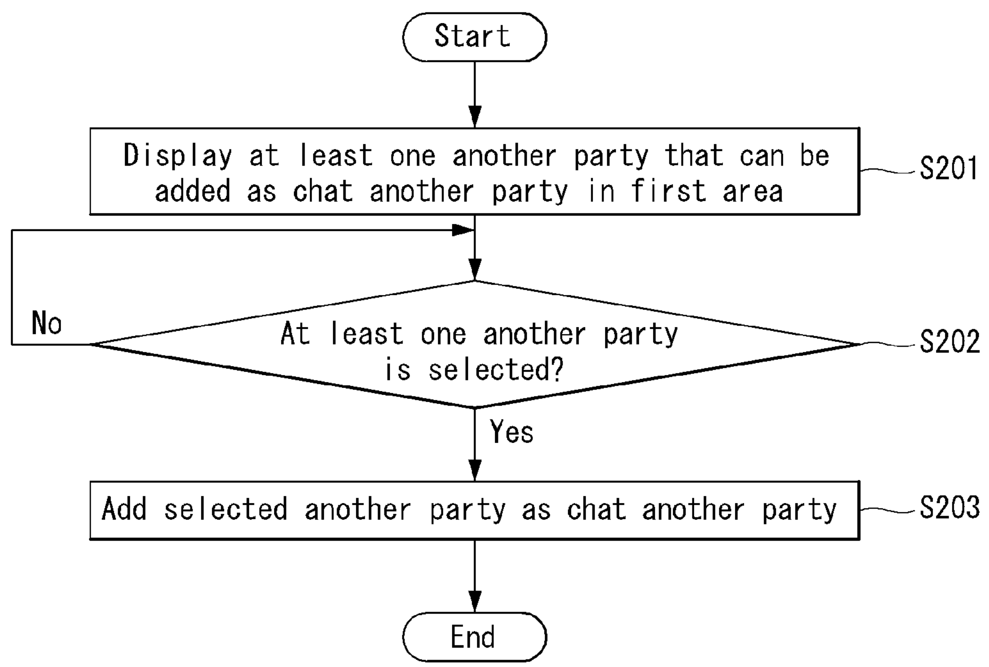
FIG. 6 is a detailed flowchart of steps S104 and S105 of FIG. 5 and illustrates a case where an item displayed in a first area is another party that can be added as chat another party.

FIG. 6 is a detailed flowchart of steps S104 and S105 of FIG. 5 and illustrates a case where an item displayed in the first area is another party that can be added as chat another party. Further, FIGS. 7 to 11 illustrate a method of adding chat another party shown in FIG. 6.

Referring to FIG. 6, in a state where a message application is executed, when a view mode of the mobile terminal 100 is converted to a landscape view mode, the controller 180 controls to display at least one another party that can be added as chat another party in the first area (S201).

Thereafter, the controller 180 determines whether at least one another party to add as chat another party among another parties displayed in the first area is selected based on the received user input (S202), and if at least one another party to add as chat another party among another parties displayed in the first area is selected based on the received user input, the controller 180 adds the selected at least one another party as chat another party (S203).

At step S201, at least one another party that can be added as chat another party may be acquired from previously stored contact information in the memory 160.

Further, at least one another party displayed in the first area may be another party selected by a preset condition among another parties acquired from previously stored contact information.

For example, at least one another party displayed in the first area may be another party registered as favorites among another parties that can transmit and receive a message.

Further, for example, at least one another party displayed in the first area may be another party who recently transmits and receives a message with the user of the mobile terminal 100 among another parties that can transmit and receive a message.

Further, for example, at least one another party displayed in the first area may be another party selected in order having many frequencies of message transmission and reception among another parties that can transmit and receive a message.

Further, for example, at least one another party displayed in the first area may be another party included in the same group as that of another party of a presently displayed message window in a second area among another parties that can transmit and receive a message.

A condition for selecting at least one another party displayed in the first area may be set by a user.

Figure 7:
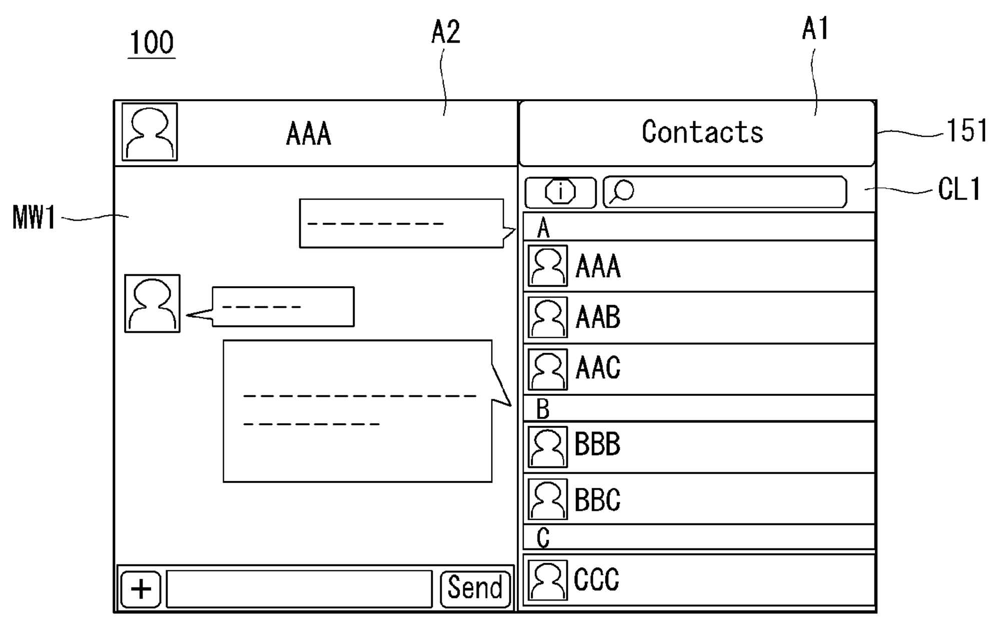
FIGS. 7 and 8 illustrate examples of displaying at least one another party that can be added as chat another party in a first area in a mobile terminal according to an exemplary embodiment of the present invention.
Figure 8:
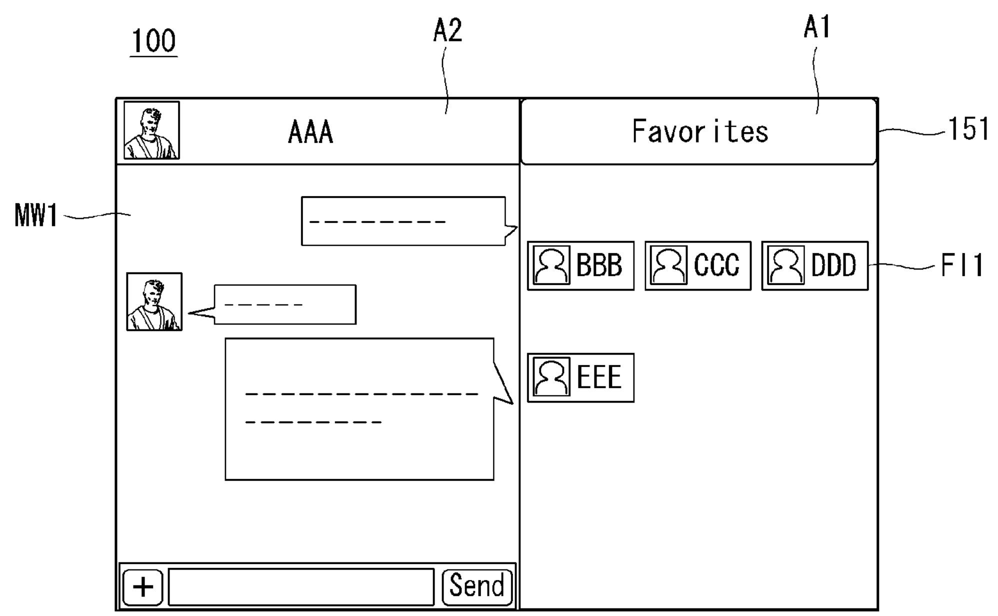

FIGS. 7 and 8 illustrate examples of displaying at least one another party that can be added as chat another party in a first area.

Referring to FIG. 7, the controller 180 controls to display another parties that can be added as chat another party in a first area A1 in a form of a list CL1. Here, another parties displayed in the first area A1 may be acquired from contact information previously stored in the memory 160.

FIG. 7 illustrates a case where another parties displayed in the first area A1 are aligned in alphabetical order of names thereof, but the present invention is not limited thereto.

According to the present invention, another parties displayed in the first area A1 may be aligned and displayed based on other conditions such as order that recently transmits and receives a message and a frequency of transmitting and receiving a message.

Referring to FIG. 8, the controller 180 controls to display another parties registered as favorites by a user among another parties that can be added as chat another party in the first area A1 in an icon FI1 form.

Referring again to FIG. 6, at step S202, the user can select another party to add as chat another party with various methods.

For example, by tapping another party displayed in the first area, the user can add the another party as chat another party. In this case, when at least one of another parties displayed in the first area is touched for a predetermined time period or more, the controller 180 determines that a user input to add the another party as chat another party is input and adds the touched another party as chat another party.

Further, for example, by touching another party displayed in the first area and dragging to the second area, the user may add chat another party. In this case, when at least one of another parties displayed in the first area is dragged to the second area, the controller 180 may determine that a user input to add the another party as chat another party is input and add the dragged another party as chat another party.

Figure 9:
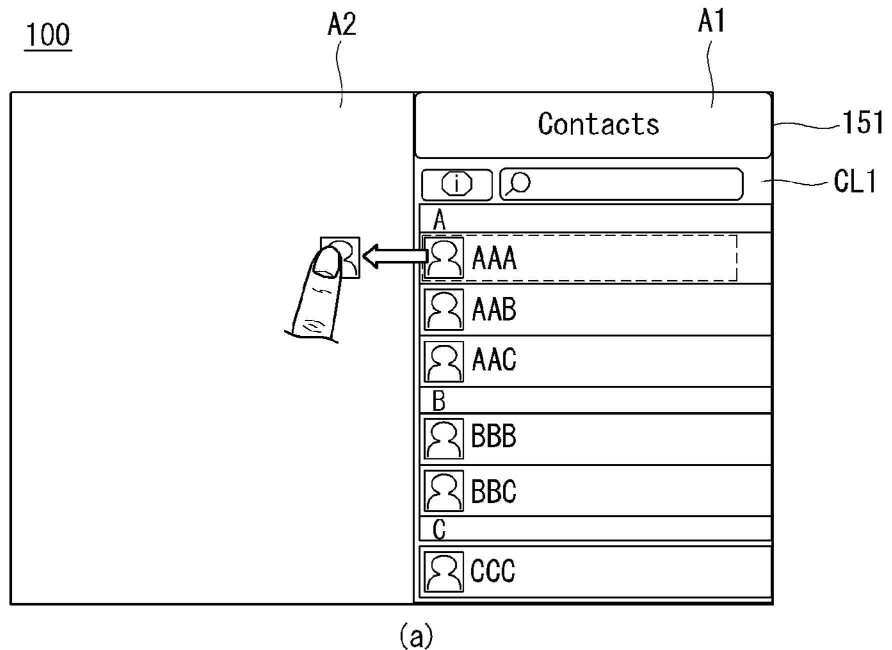
FIGS. 9 to 11 illustrate examples of adding chat another party in a mobile terminal according to an exemplary embodiment of the present invention.
Figure 9:
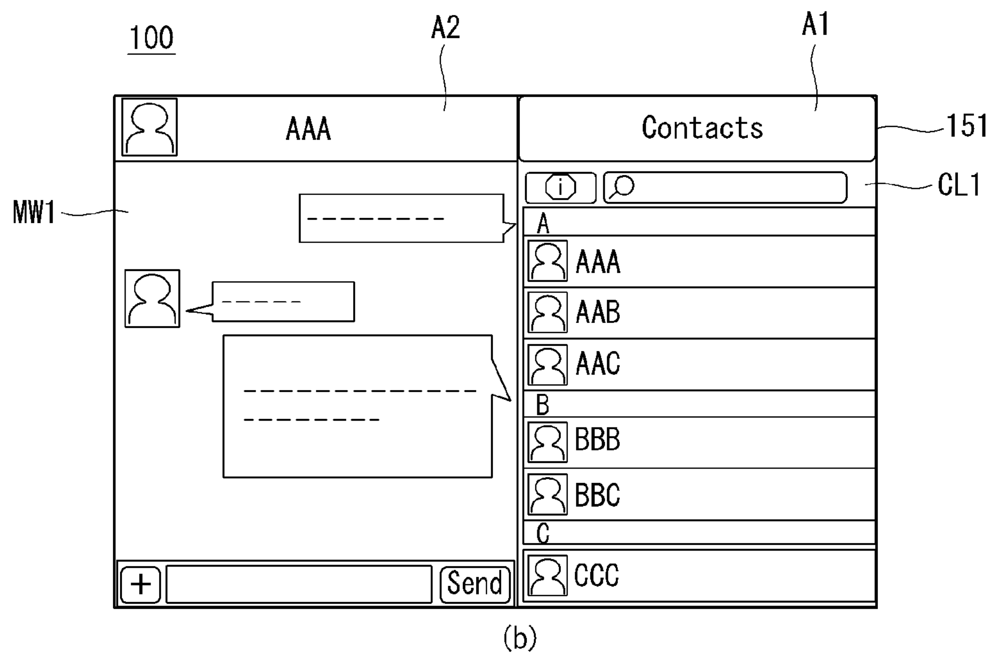
Figure 10:
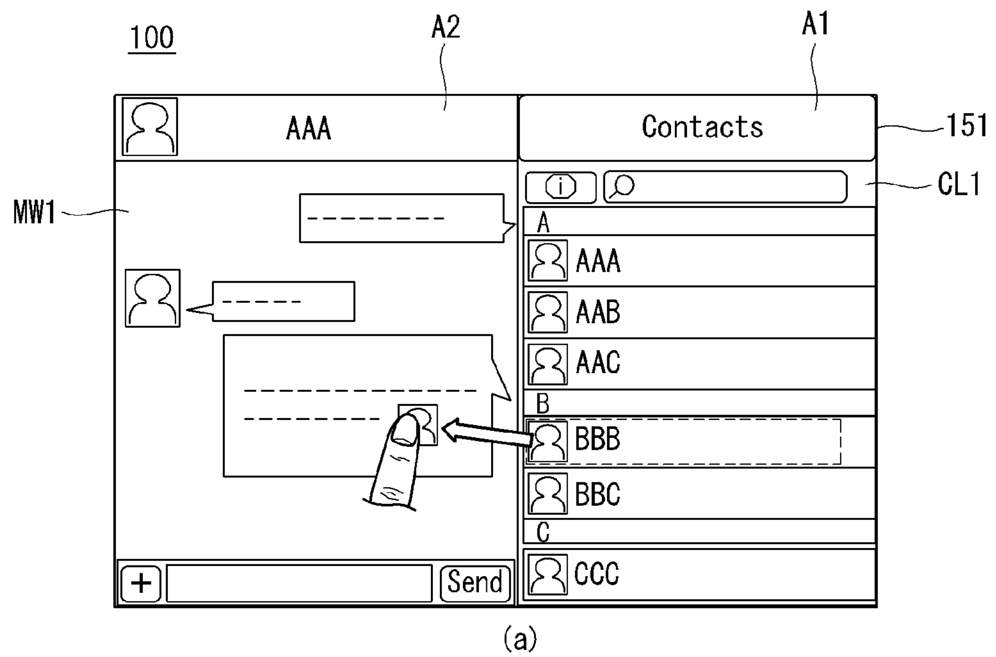
Figure 10:
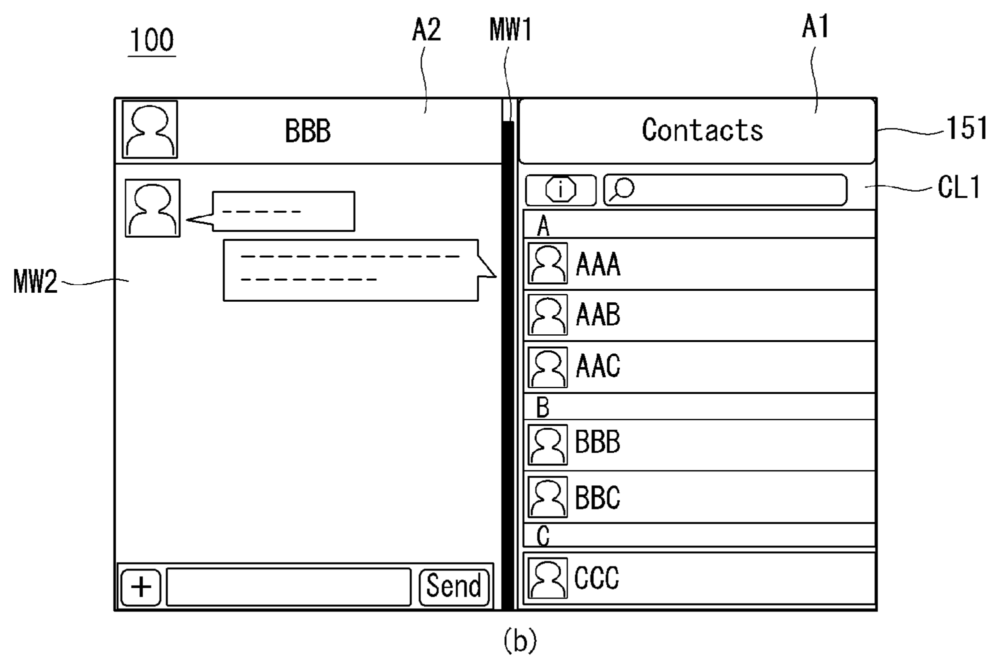
Figure 11:
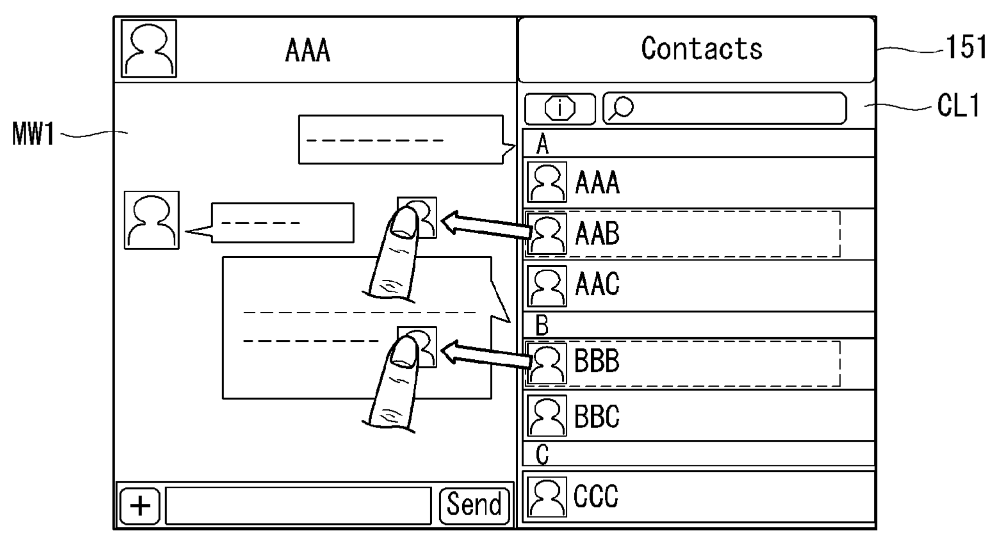

FIGS. 9 to 11 illustrate examples of adding chat another party.

Referring to FIG. 9(*a*), the controller 180 controls to display a list CL1 of another parties that can add as chat another party in the first area A1. Further, because a presently activated message window does not exist, an empty screen is displayed in a second area A2.

Further, when a first another party AAA of another parties displayed in the first area A1 is touched and dragged to the second area A2, the controller 180 receives a chat another party addition request of the first another party AAA.

Accordingly, as shown in FIG. 9(*b*), the controller 180 generates a first message window MW1 with the dragged first another party AAA. Further, the controller 180 controls to display the generated first message window MW1 in the second area A2.

Thereafter, the controller 180 controls to display a message transmitted and received with the first another party AAA in the first message window MW1.

FIG. 9 illustrates a case where the second area A2 is displayed as an empty screen when a presently generated message window does not exist, but the present invention is not limited thereto. According to the present invention, when a presently generated message window does not exist, guide information for guiding a method of adding chat another party may be displayed in the second area A2.

Referring to FIG. 10(*a*), the controller 180 controls to display a list CL1 of another parties that can be added as chat another party in the first area A1. Further, the controller 180 controls to display the first message window MW1 while chatting with the first another party AAA in the second area A2.

Further, when the second another party BBB of another parties displayed in the first area A1 is touched and dragged to the second area A2, the controller 180 receives a user input to add the second another party BBB as chat another party.

Accordingly, as shown in FIG. 10(*b*), the controller 180 generates a dragged second message window MW2 with the second another party BB(b). Further, the controller 180 controls to display the generated second message window MW2 in the second area A2.

Referring to FIG. 10(*b*), when the second message window MW2 is added, in order to display a portion of the first message window MW1 on the screen, the controller 180 controls to overlappingly display the second message window MW2 on the first message window MW1. Accordingly, the user can touch a partial area of the first message window MW1 displayed on the screen and move the partial area to a corresponding message window MW1.

According to an exemplary embodiment of the present invention, a plurality of users may be also simultaneously added as chat another party.

Referring to FIG. 11, when second another party BBB and third another party AAB of another parties displayed in the first area are touched and are dragged to the second area A2, the controller 180 receives a user input to add the second another party BBB and the third another party AAB as chat another party.

Accordingly, the controller 180 generates message windows for each of the second another party BBB and the third another party AAB and controls to display the generated message windows in the second area A2.

According to an exemplary embodiment of the present invention, as described above, when a view mode of the mobile terminal is converted to a landscape view mode, if another parties that can be added as chat another party are displayed in a partial area of the screen, the user can add chat another party by only simple manipulation. Further, when attempting to add chat another party, to move again to the message window and to send a message, a manipulation for screen conversion is unnecessary and thus user convenience is improved.

At step S104, an item displayed in the first area may include the remaining message windows, except for a message window displaying in the second area among presently executing message windows. That is, the controller 180 controls to display presently executing and movable message windows in the first area.

Figure 12:
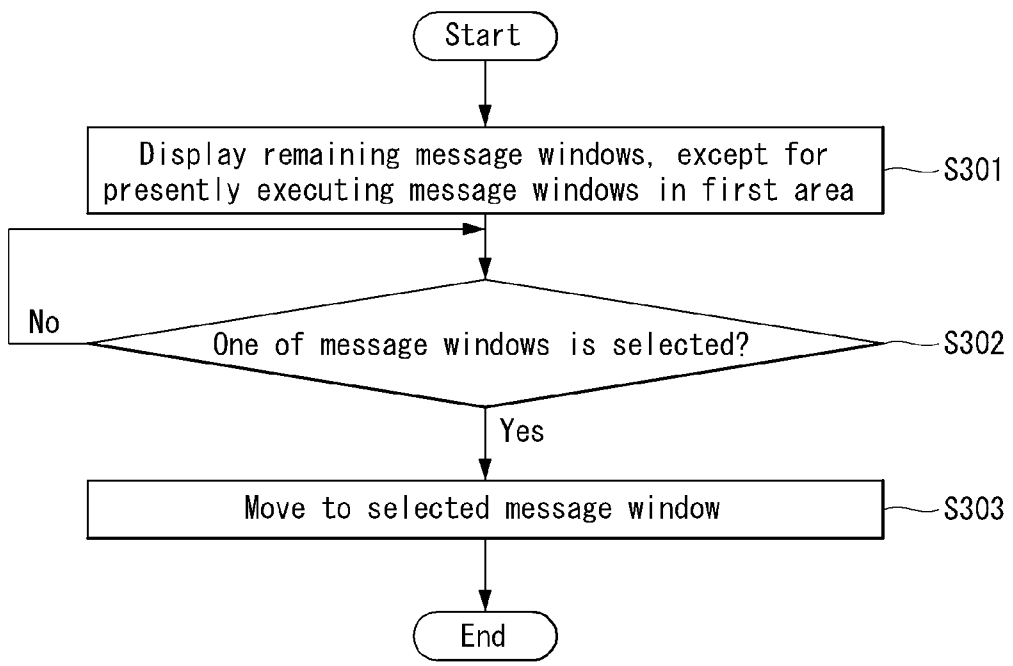
FIG. 12 is a detailed flowchart of steps S104 and S105 of FIG. 5 and illustrates a case where an item displayed in a first area is a message window that is not displayed on a present screen.

FIG. 12 is a detailed flowchart of steps S104 and S105 of FIG. 5 and illustrates a case where an item displayed in the first area is a message window that is not displayed in a present screen. Further, FIGS. 13 and 14 illustrate a method of performing movement between message windows shown in FIG. 12.

Referring to FIG. 12, the controller 180 controls to display the remaining message windows, except for a message window displayed in the second area among presently executing message windows in the first area (S301). That is, the controller 180 controls to display at least one movable message window in the first area.

Thereafter, the controller 180 determines whether one of message windows displayed in the first area is selected (S302), and if one of message windows displayed in the first area is selected, the controller 180 controls to move the selected message window (S303). Further, when the selected message window is moved, the controller 180 controls to display a corresponding message window in the second area.

Figure 13:
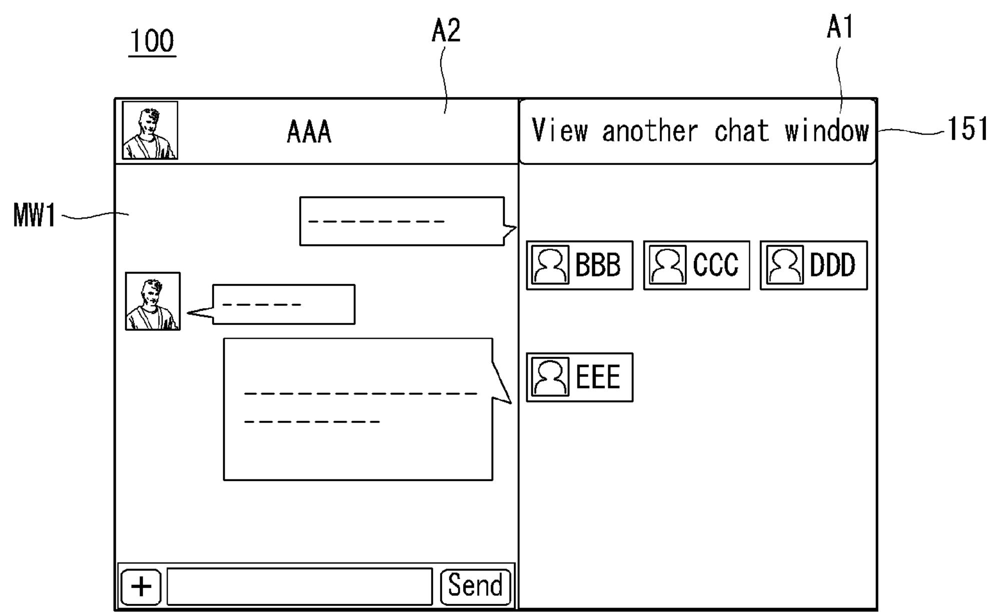
FIG. 13 illustrates an example of displaying at least one movable message window in a first area in a mobile terminal according to an exemplary embodiment of the present invention.
Figure 14:
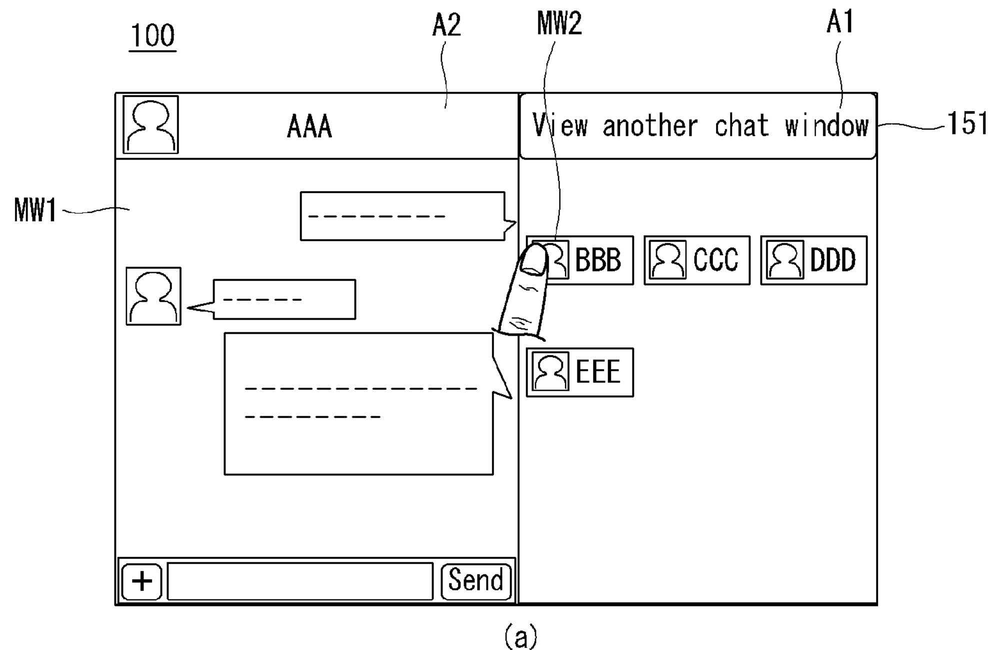
FIG. 14 illustrates an example of moving to a message window selected in a first area in a mobile terminal according to an exemplary embodiment of the present invention.
Figure 14:
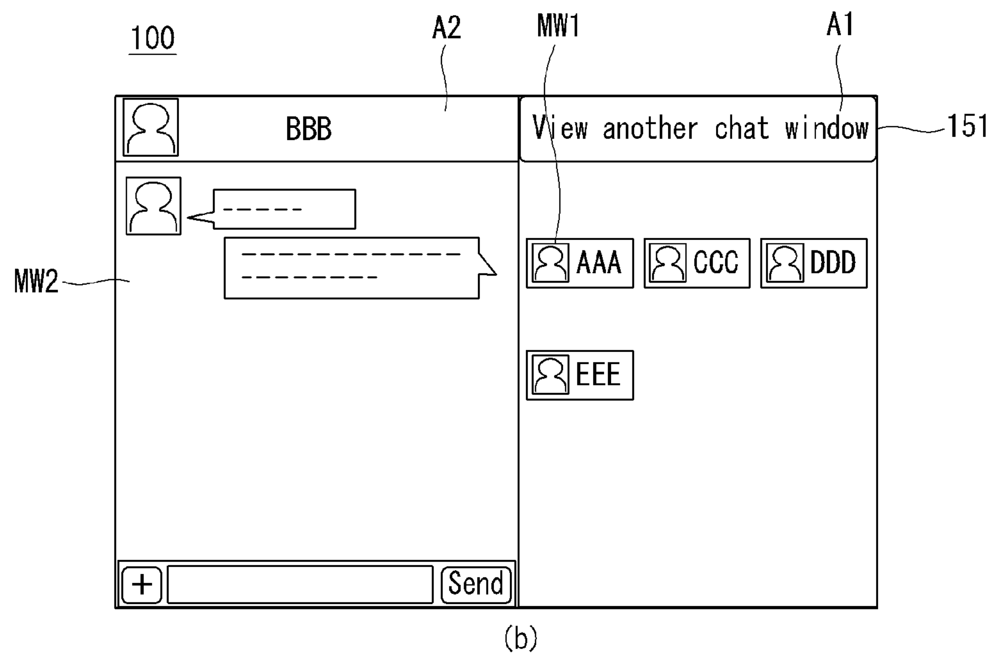

FIG. 13 illustrates an example of displaying at least one movable message window in a first area.

Referring to FIG. 13, when a view mode of the mobile terminal 100 while executing a message application is converted to a landscape view mode, the controller 180 controls to display the remaining message windows, except for the first message window MW1 displaying in the second area A2 among presently executing message windows in the first area A1.

Each message window displayed in the first area A1 may be displayed in a short icon form based on another party information of each message window. In FIG. 13, for example, each message window may be displayed using a short icon for displaying identification information of another party transmitting and receiving a message through a corresponding message window.

FIG. 14 illustrates an example of moving a message window selected in a first area.

Referring to FIG. 14(*a*), the controller 180 controls to display movable message windows in a short icon form in the first area.

Further, when the second message window MW2 of message windows displayed in the first area is touched, the controller 180 controls to move the second message window MW2. That is, as shown in FIG. 14(*b*), the controller 180 controls to display the second message window MW2 in the second area A2.

When the second message window MW2 is moved, the controller 180 controls to add a short icon of the first message window MW1 converted to an inactivated state to the first area A1, and thus the user can easily move from the second message window MW2 to the first message window MW1.

According to an exemplary embodiment of the present invention, as described above, when a plurality of message windows are executing in a landscape view mode, movable message windows are displayed in a partial area of the screen and one of them can be selected and moved and thus movement between message windows can be easily performed.

Referring again to FIG. 5, at step S104, an item displayed in the first area includes at least one application that can be executed by interlocking with a message application.

Figure 15:
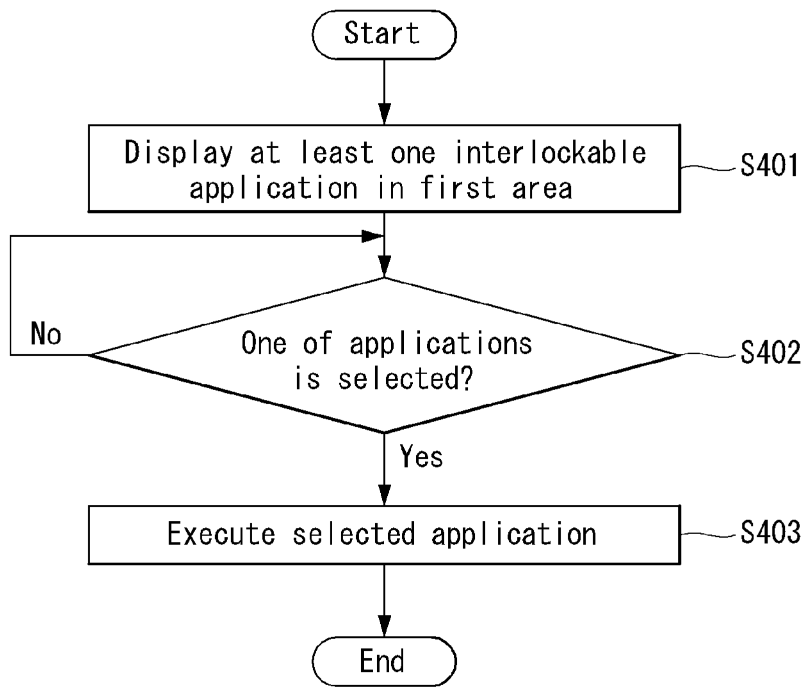
FIG. 15 is a detailed flowchart of steps S104 and S105 of FIG. 5 and illustrates a case where an item displayed in a first area is an interlockable application.

FIG. 15 is a detailed flowchart of steps S104 and S105 of FIG. 5 and illustrates a case where an item displayed in the first area is an interlockable application. Further, FIGS. 16 to 19 illustrate a method of executing an application shown in FIG. 15.

Referring to FIG. 15, in a state where a message application is executed, when a view mode of the mobile terminal 100 is converted to a landscape view mode, the controller 180 controls to display at least one application that can be applied by interlocking with a message application in the first area (S401).

Thereafter, the controller 180 determines whether one of applications displayed in the first area is selected (S402), and if one of applications displayed in the first area is selected, the controller 180 executes the selected application (S403). Further, the controller 180 controls to display an execution screen of the selected application in the first area.

Figure 16:
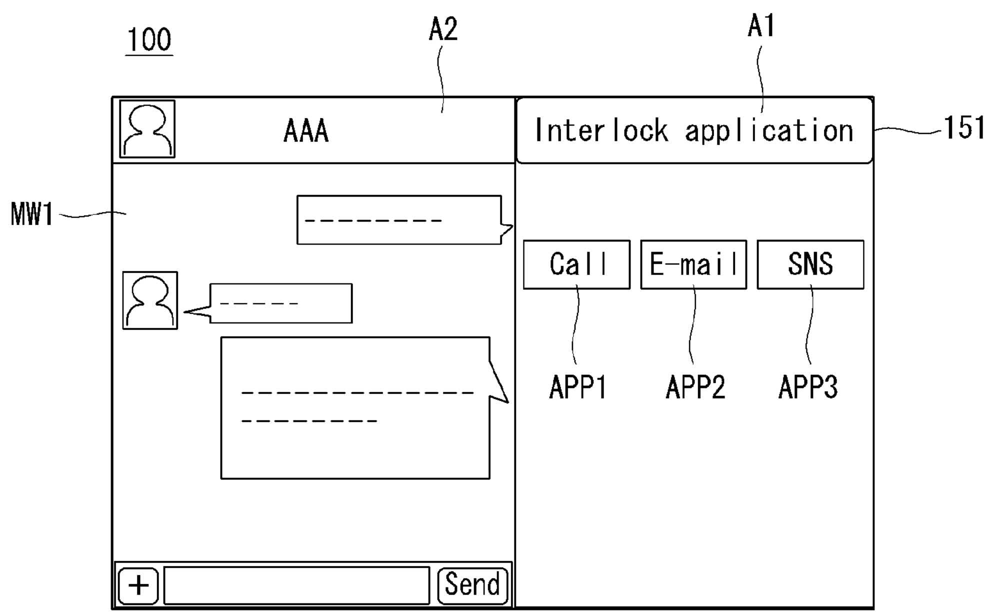
FIG. 16 illustrates an example of displaying at least one interlockable application in a first area in a mobile terminal according to an exemplary embodiment of the present invention.

FIG. 16 illustrates an example of displaying at least one interlockable application in a first area.

Referring to FIG. 16, while executing a message application, when a view mode of the mobile terminal 100 is converted to a landscape view mode, the controller 180 controls to display applications APP1 to APP3 that can executed by interlocking with the message application in the first area A1.

In FIG. 16, an application that can be linked to the message application may include a call APP1, an e-mail APP2, and a social network service (SNS) APP3.

However, FIG. 16 illustrates an example of displaying interlockable applications, but the present invention is not limited thereto. An interlockable application displayed in the first area may include more applications or fewer applications than applications shown in FIG. 16.

Referring again to FIG. 15, if any one application is selected at step S402, the controller 180 executes the selected application using chat contents of a presently displaying message window and another party information.

Figure 17:
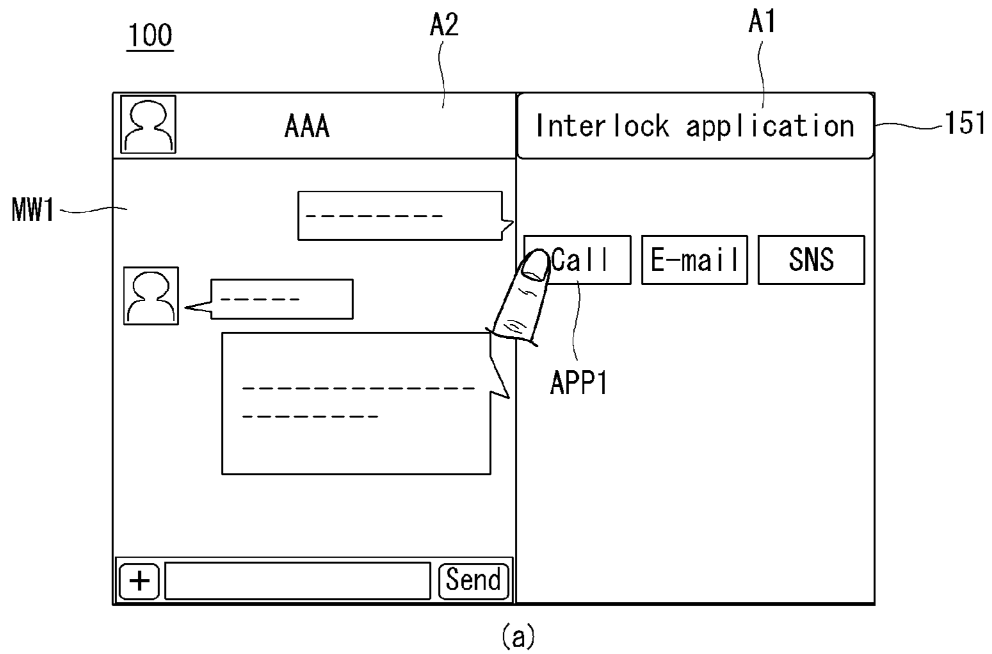
FIGS. 17 to 19 illustrate examples of executing an application selected in a first area in a mobile terminal according to an exemplary embodiment of the present invention.
Figure 17:
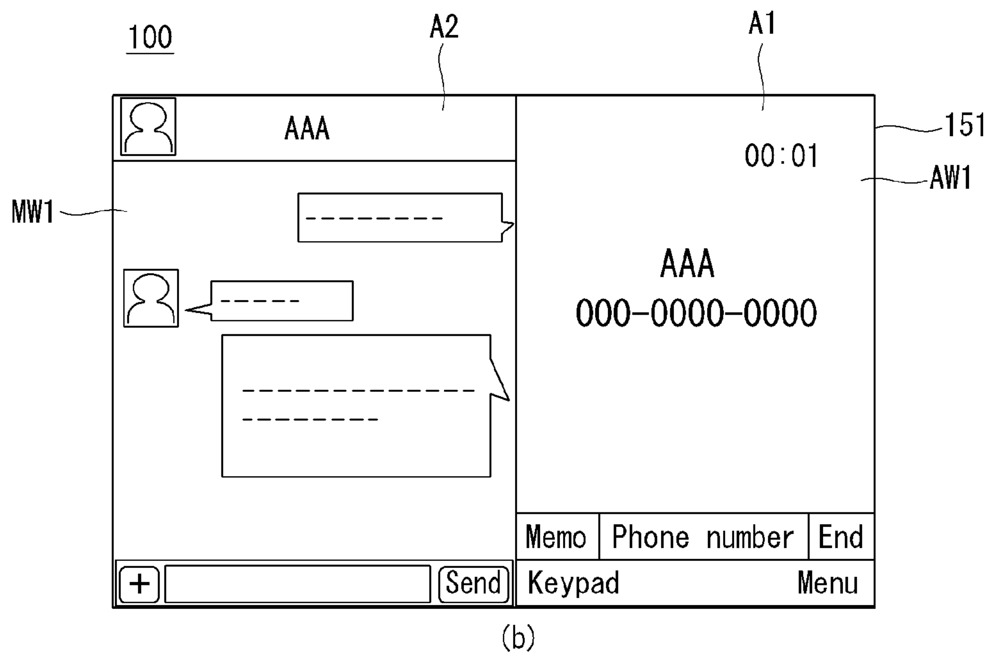
Figure 18:
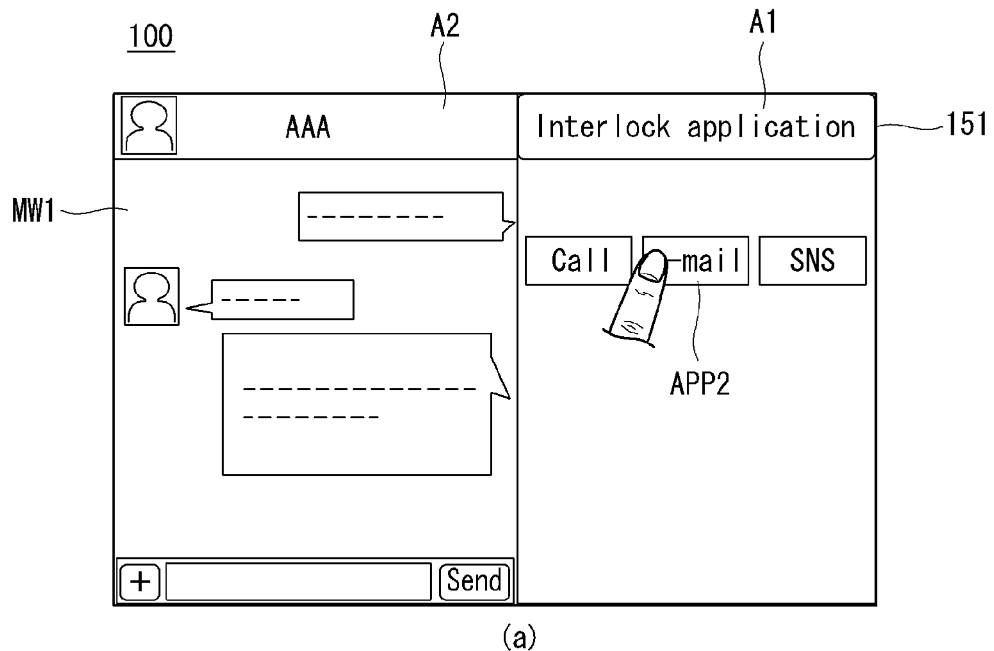
Figure 18:
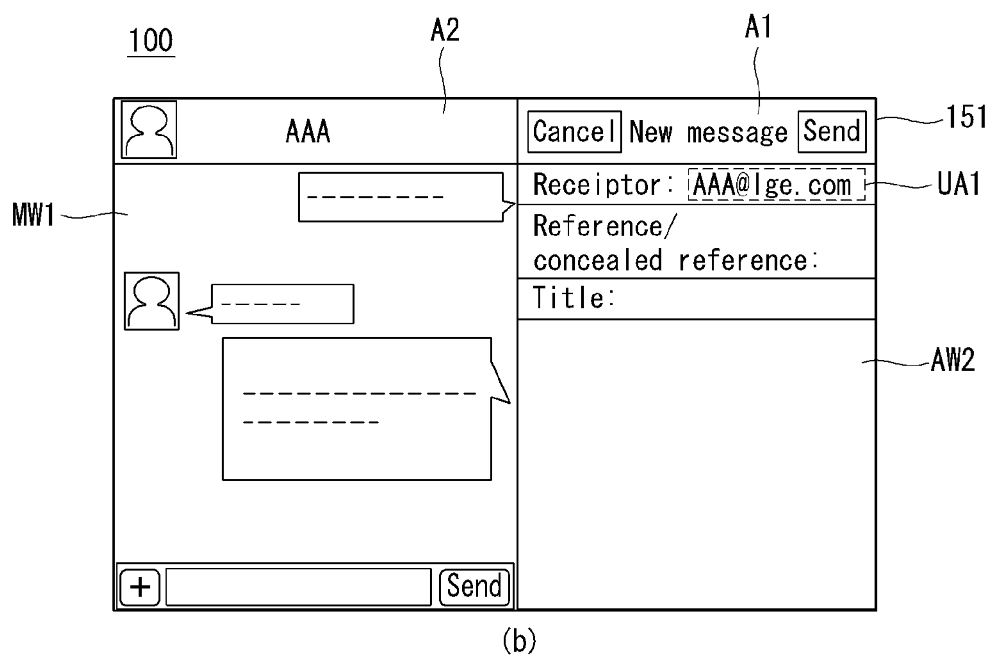
Figure 19:
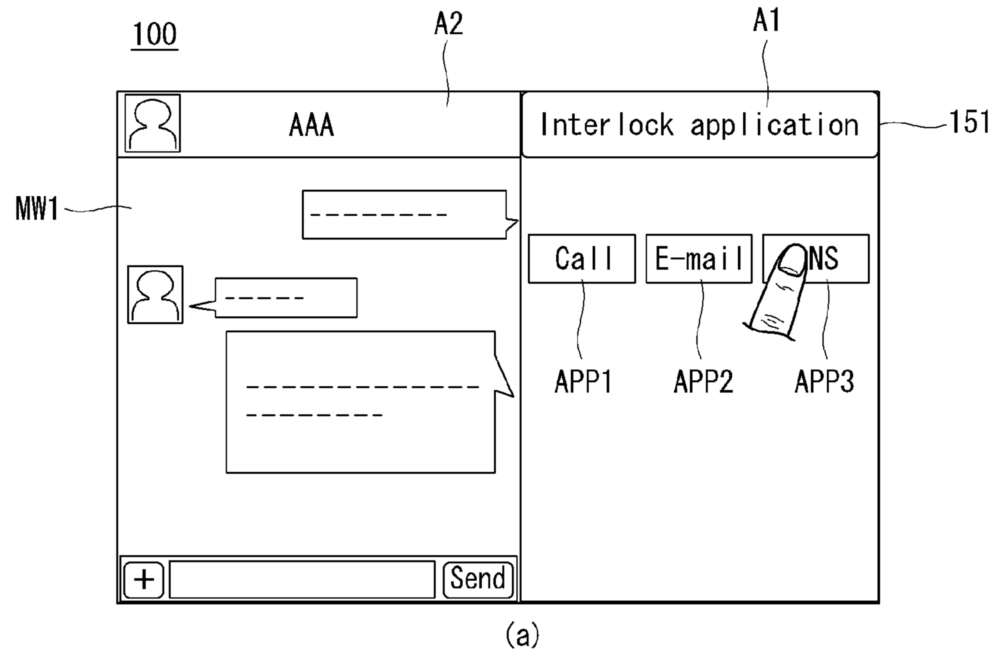
Figure 19:
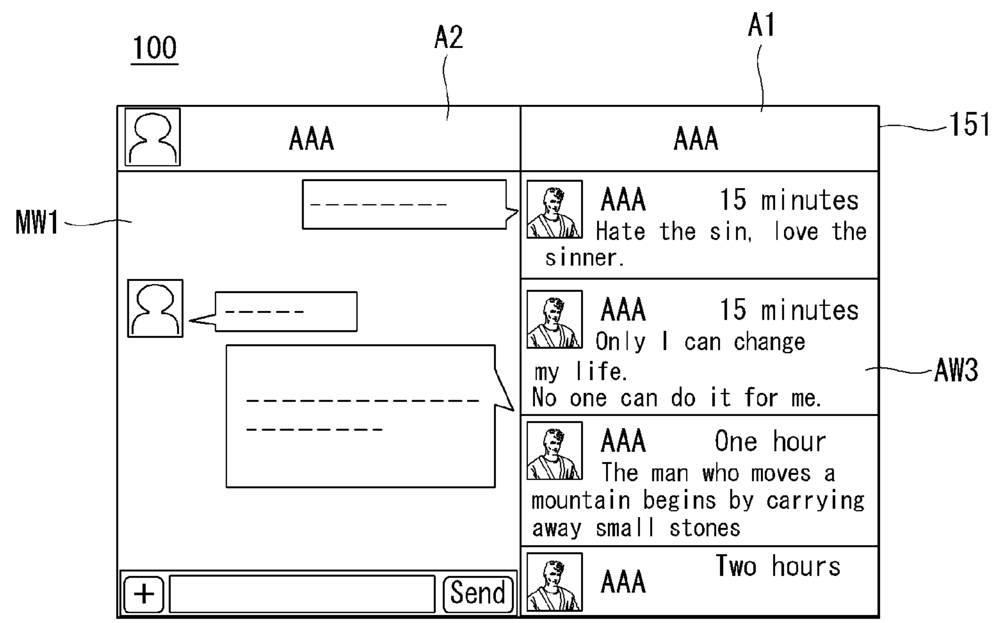

FIGS. 17 to 19 illustrate examples of executing an application selected in a first area.

Referring to FIG. 17(*a*), when the call APP1 of applications APP1 to APP3 displayed in the first area is selected, the controller 180 executes a call function, as shown in FIG. 17(*b*). Further, the controller 180 controls to display a call screen AW1 in the first area.

Referring to FIG. 17(*b*), when a call function is executed, the controller 180 uses another party information of the first another party AAA while transmitting and receiving a message through the message window MW1 displayed in the second area A2. That is, the controller 180 acquires a phone number of the first another party AAA and attempts a call connection with the first another party AAA using the acquired phone number of the first another party AAA.

FIG. 17 illustrates an example of executing a message application and a call application by interlocking, but the present invention is not limited thereto. According to the present invention, when a call application is selected, other functions instead of a call function may be executed.

For example, when a call application is selected, by executing a recent call record display function, the controller 180 may control to display a recent call record with the first another party AAA in the first area A1.

Referring to FIG. 18(*a*), when the e-mail application APP2 of applications APP1 to APP3 displayed in the first area is selected, the controller 180 executes an e-mail application, as shown in FIG. 18(*b*). Further, the controller 180 controls to display an execution screen AW2 of the e-mail application in the first area A1.

Referring to FIG. 18(*b*), when the e-mail application is executed, the controller 180 acquires another party information, i.e., an e-mail address UA1 of the first another party AAA while transmitting and receiving a message through the first message window MW1 displayed in the second area A2. Further, the controller 180 controls to display an e-mail writing screen AW2 to transmit to the first another party AAA in the first area A1 based on the acquired e-mail address UA1.

That is, the controller 180 automatically inputs the e-mail address UA1 of the first another party AAA to a receipt item of the e-mail writing screen AW2.

FIG. 18 illustrates an example of executing a message application and an e-mail application by interlocking, but the present invention is not limited thereto. According to the present invention, when the e-mail application is selected, other functions instead of an e-mail writing function may be executed.

For example, when the e-mail application is selected, the controller 180 may control to display e-mail transmitting and receiving contents with the first another party AAA in the first area based on an e-mail address of the first another party AAA acquired from the first message window MW1.

Further, for example, when the e-mail application is selected, the controller 180 may control to display an e-mail writing screen to which messages transmitted and received through the first message window MW1 are attached in the first area.

Referring to FIG. 19(*a*), when an SNS APP3 of applications APP1 to APP3 displayed in the first area is selected, the controller 180 executes an SNS application, as shown in FIG. 19(*b*). Further, the controller 180 controls to display an execution screen AW3 of the SNS application in the first area A1.

Referring to FIG. 19(*b*), when the SNS application is executed, the controller 180 acquires another party information, i.e., an SNS account of the first another party AAA while transmitting and receiving a message through a message window MW1 displayed in the second area A2. Further, by connecting the acquired SNS account to an SNS service server, the controller 180 may control to display SNS contents of the first another party AAA in the first area.

FIG. 19 illustrates an example of executing an SNS application by interlocking, but the present invention is not limited thereto. According to the present invention, when the SNS application is executed, the controller 180 may execute others function in addition to a function of displaying SNS contents of another party.

For example, when the SNS application is executed, the controller 180 may upload messages transmitted and received through the first message window MW1 to an SNS account of the user of the mobile terminal 100.

According to an exemplary embodiment of the present invention, as described above, when an application that can be interlocked in a landscape view mode is displayed in a partial area of a screen and one application is selected, by executing a selected application using another party information and chat contents automatically acquired through a message application, when executing the application, user convenience is improved.

Referring again to FIG. 5, at step S104, the item displayed in the first area includes at least one content that can be attached to the message.

Figure 20:
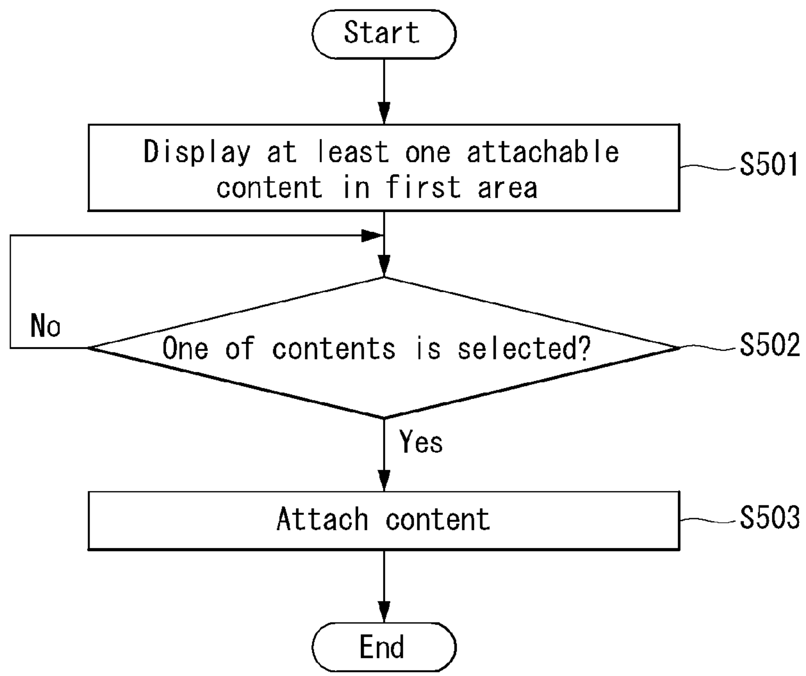
FIG. 20 is a detailed flowchart of steps S104 to S105 of FIG. 5 and illustrates a case where an item displayed in a first area is an attachable content.

FIG. 20 is a detailed flowchart of steps S104 to S105 of FIG. 5 and illustrates a case where an item displayed in the first area is an attachable content. Further, FIGS. 21 and 22 illustrate a method of attaching contents shown in FIG. 20.

Referring to FIG. 20, in a state where a message application is executed, when a view mode of the mobile terminal 100 is converted to a landscape view mode, the controller 180 controls to display at least one content that can be attached to the message in the first area (S501). Here, the contents may include a picture, music, and a moving picture.

Thereafter, the controller 180 determines whether one of contents displayed in the first area is selected (S502), if one of contents displayed in the first area is selected, the controller 180 attaches and transmits the selected content to the message (S503).

Figure 21:
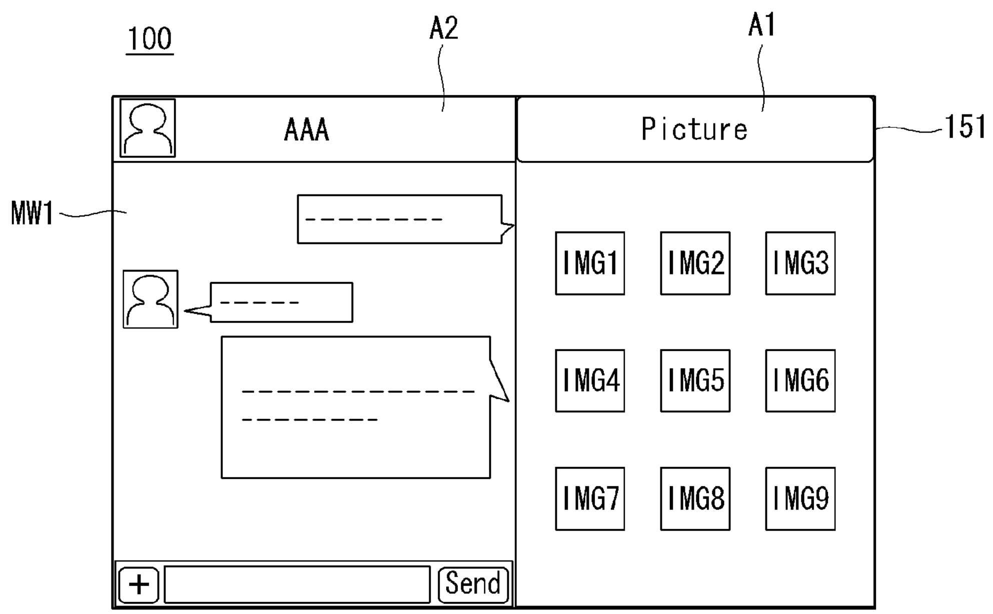
FIG. 21 illustrates an example of displaying at least one attachable content in a first area in a mobile terminal according to an exemplary embodiment of the present invention and illustrates a case where the content is an image.
Figure 22:
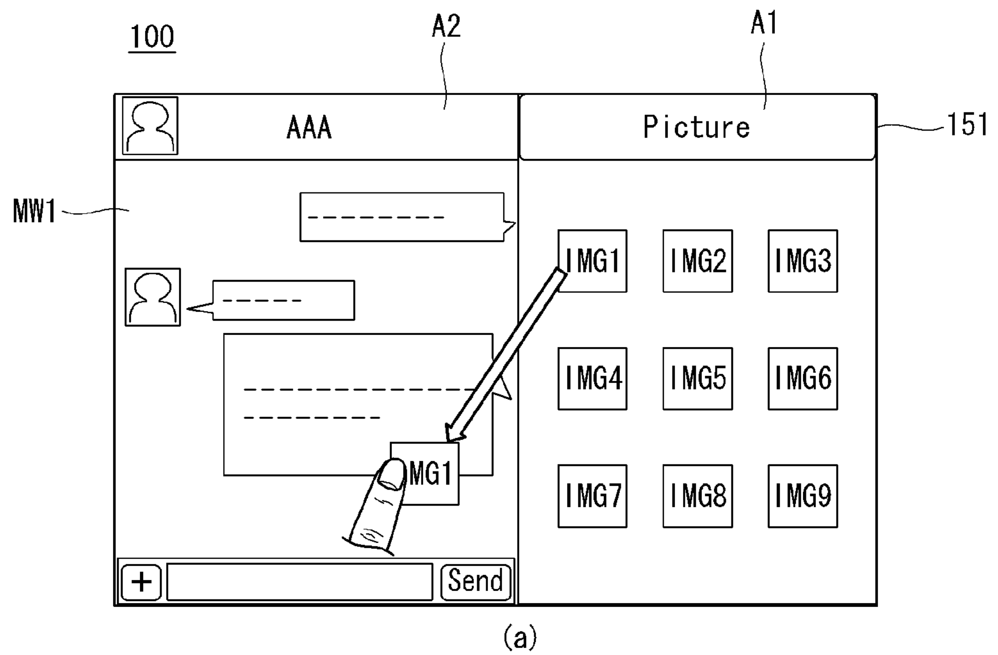
FIG. 22 illustrates an example of transmitting contents selected in a first area in a mobile terminal according to an exemplary embodiment of the present invention.
Figure 22:
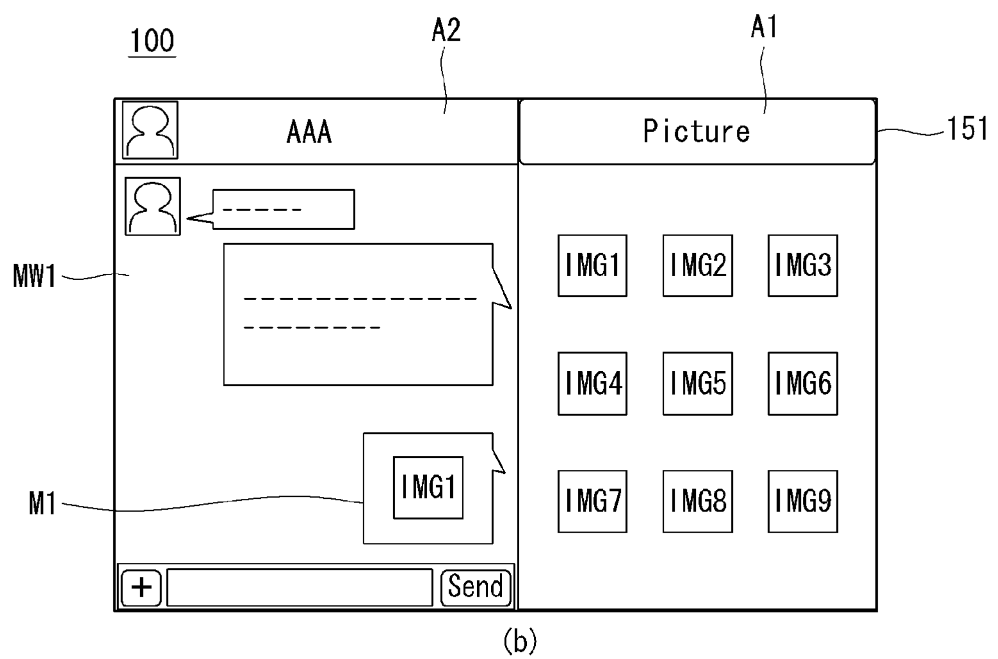

FIG. 21 illustrates an example of displaying at least one attachable content in a first area and illustrates a case where the content is an image.

Referring to FIG. 21, while executing a message application, when a view mode of the mobile terminal 100 is converted to a landscape view mode, the controller 180 controls to display images IMG1 to IMG9 that can be attached to the message in the first area A1.

FIG. 22 illustrates an example of transmitting contents selected in a first area.

Referring to FIG. 22(*a*), the controller 180 controls to display images IMG1 to IMG9 that can be attached to the message in the first area A1.

Further, when an image IMG1 of images IMG1 to IMG9 displayed in the first area is dragged to the first message window MW1, the controller 180 transmits a message M1 to which the dragged image IMG1 is attached to another party AAA of the first message window MW1.

Further, as shown in FIG. 22(*b*), the controller 180 controls to display the transmitted message M1 in the first message window MW1.

FIG. 22 illustrates a case of transmitting the message M1 to which the dragged image IMG1 is attached to another party AAA of the first message window MW1 by dragging one image IMG1 displayed in the first area A1 to the first message window MW1, but the present invention is not limited thereto.

According to the present invention, by dragging contents displayed in the first area to the message input window, when contents are attached to a writing message and message writing is complete, the user may transmit a message to which the dragged contents are attached to another party AAA of the first message window MW1.

According to an exemplary embodiment of the present invention, as described above, while executing a message application, when a view mode of the mobile terminal is converted to a landscape view mode, by displaying attachable contents in a partial area of the screen, convenience of a user wishing to attach contents to a message is improved.

Referring again to FIG. 5, at step S104, the item displayed in the first area may include at least one selectable menu item related to a message application.

Figure 23:
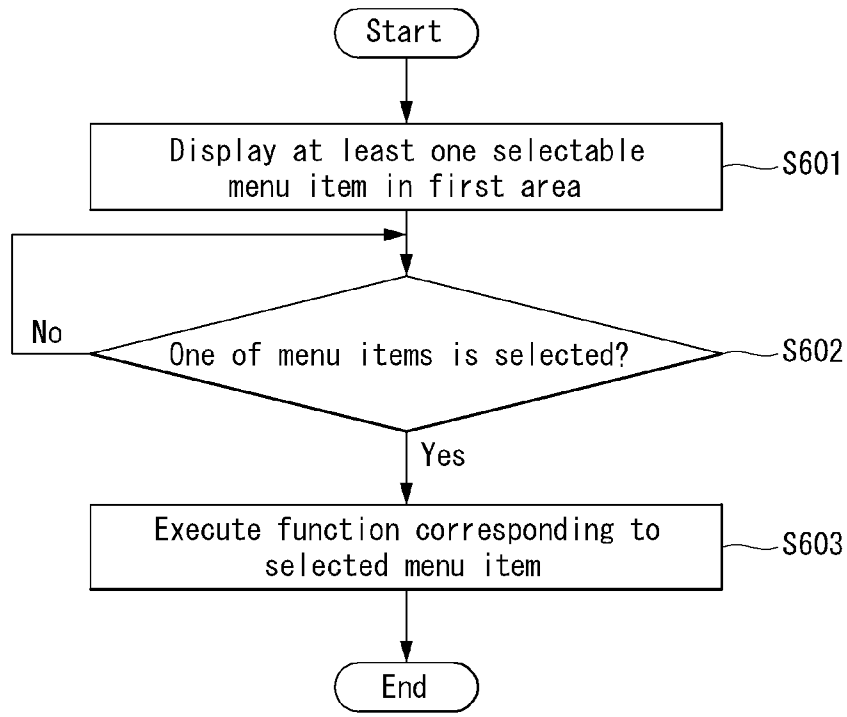
FIG. 23 is a detailed flowchart of steps S104 and S105 of FIG. 5 and illustrates a case where an item displayed in a first area is a selectable menu item.

FIG. 23 is a detailed flowchart of steps S104 and S105 of FIG. 5 and illustrates a case where an item displayed in the first area is a selectable menu item. Further, FIGS. 24 to 28 illustrate a method of executing a menu shown in FIG. 23.

Referring to FIG. 23, in a state where a message application is executed, when a view mode of the mobile terminal 100 is converted to a landscape view mode, the controller 180 controls to display at least one selectable menu item related to the message application in the first area (S601). Here, executable functions related to the message application correspond to each menu item.

Thereafter, the controller 180 determines whether one of menu items displayed in the first area is selected (S602), and if one of menu items displayed in the first area is selected, the controller 180 executes a function corresponding to the selected menu item (S603).

Figure 24:
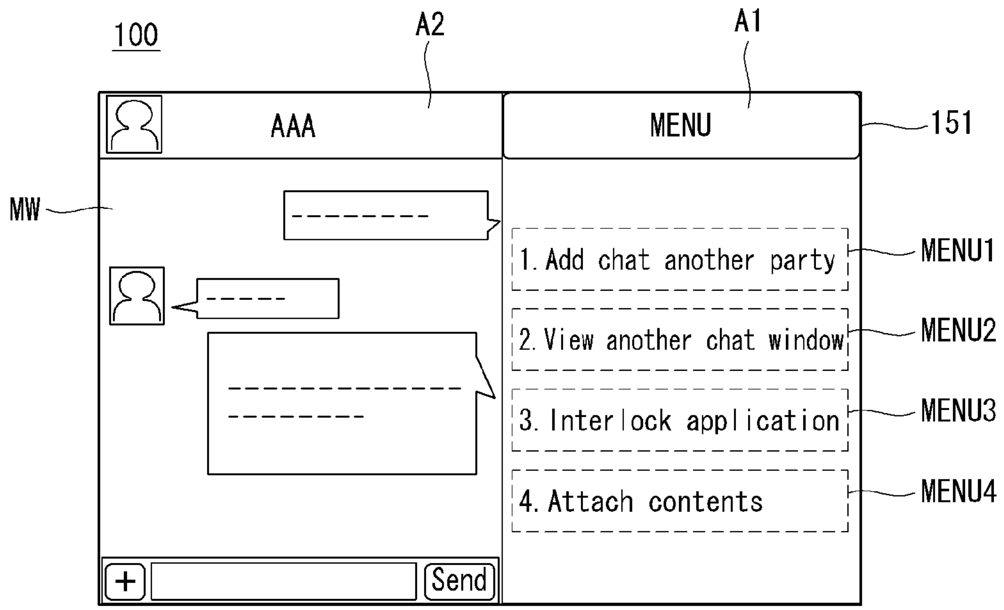
FIG. 24 illustrates an example of displaying a menu item related to a message application in a first area in a mobile terminal according to an exemplary embodiment of the present invention.

FIG. 24 illustrates an example of displaying a menu item related to a message application in a first area.

Referring to FIG. 24, in a state where a message application is executed, when a view mode of the mobile terminal 100 is converted to a landscape view mode, the controller 180 controls to display selectable menu items MENU1 to MENU4 related to the message application in the first area A1.

Different functions related to a message application correspond to each menu item displayed in the first area. In FIG. 24, for example, a function of adding chat another party, a function of viewing another message window, a function of interlocking an application, and a function of attaching contents may correspond to each menu item.

Further, when one of menu items MI1 to MI4 displayed in the first area is selected by the user, the controller 180 executes a function corresponding to the selected menu item.

FIG. 24 illustrates an example of displaying at least one selectable menu item related to a message application, but the present invention is not limited thereto. According to an exemplary embodiment of the present invention, menu items displayed in the first area may include more menu items or fewer menu items than menu items shown in FIG. 24.

FIGS. 25 to 28 illustrate examples of executing a selected menu item.

Figure 25:
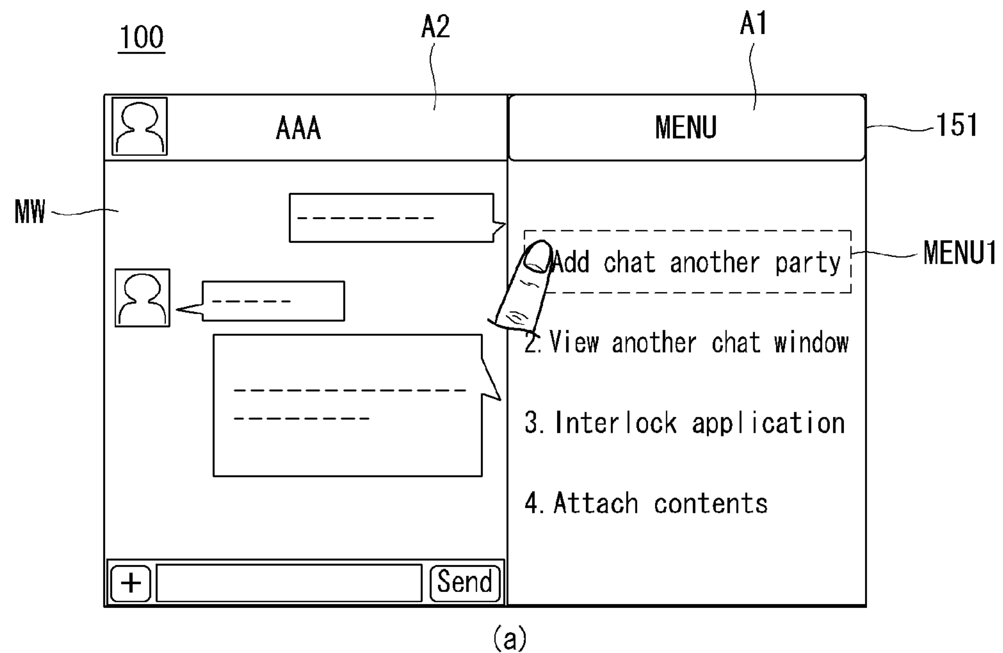
FIGS. 25 to 28 illustrate examples of executing a selected menu item in a mobile terminal according to an exemplary embodiment of the present invention.
Figure 25:
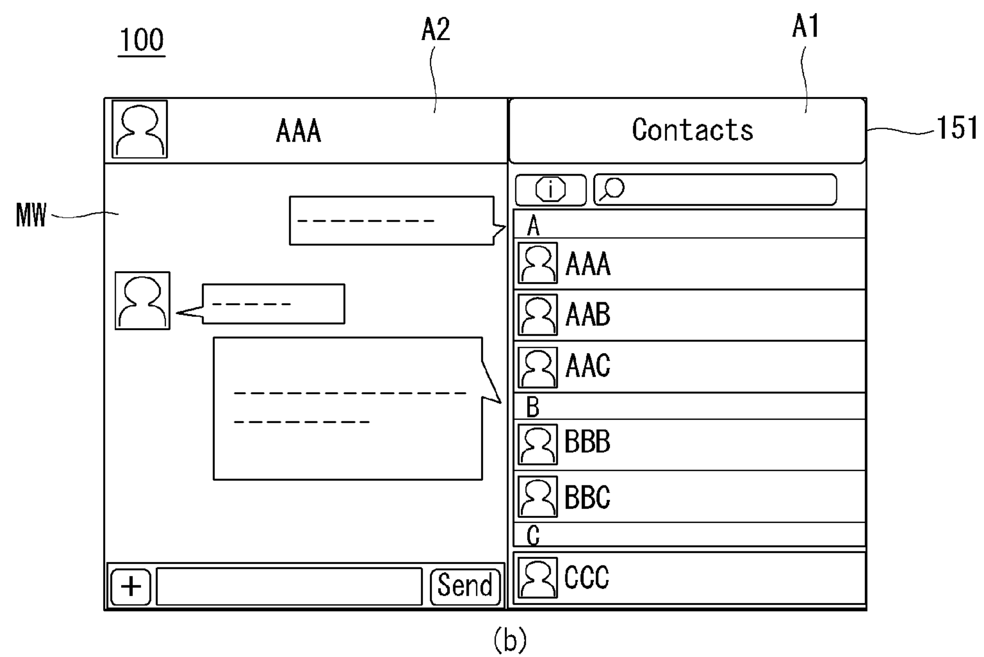

Referring to FIG. 25(*a*), when a 'chat another party addition' MENU1 item is selected from menu items displayed in the first area, the controller 180 executes a function of adding chat another party.

Further, when a function of adding chat another party is executed, the controller 180 controls to display another parties that can be added as chat another party in the first area, as shown in FIG. 25(*b*).

Figure 26:
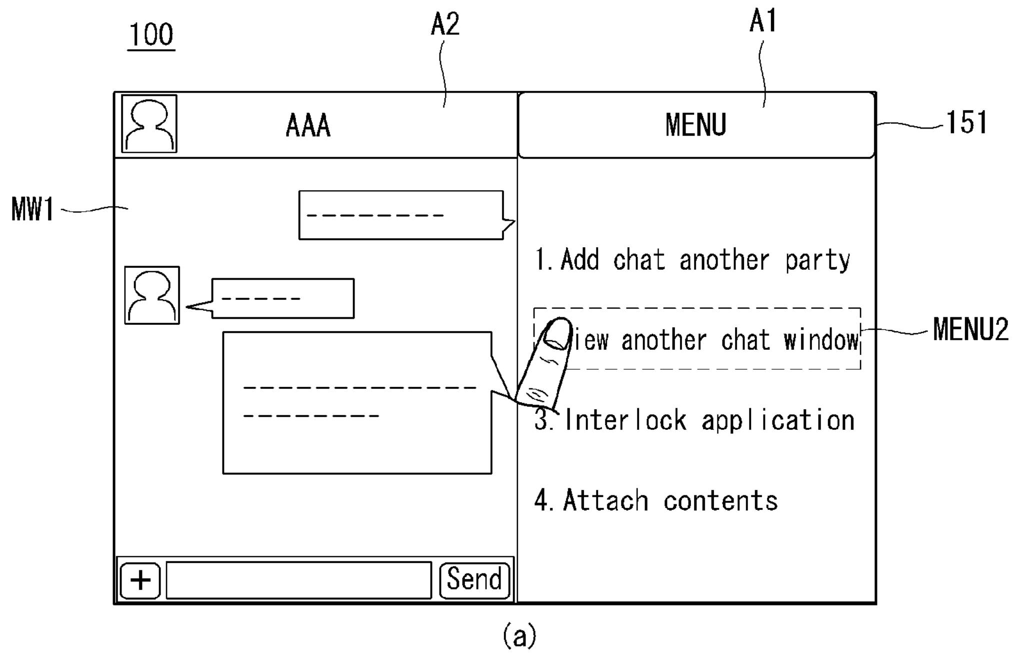
Figure 26:
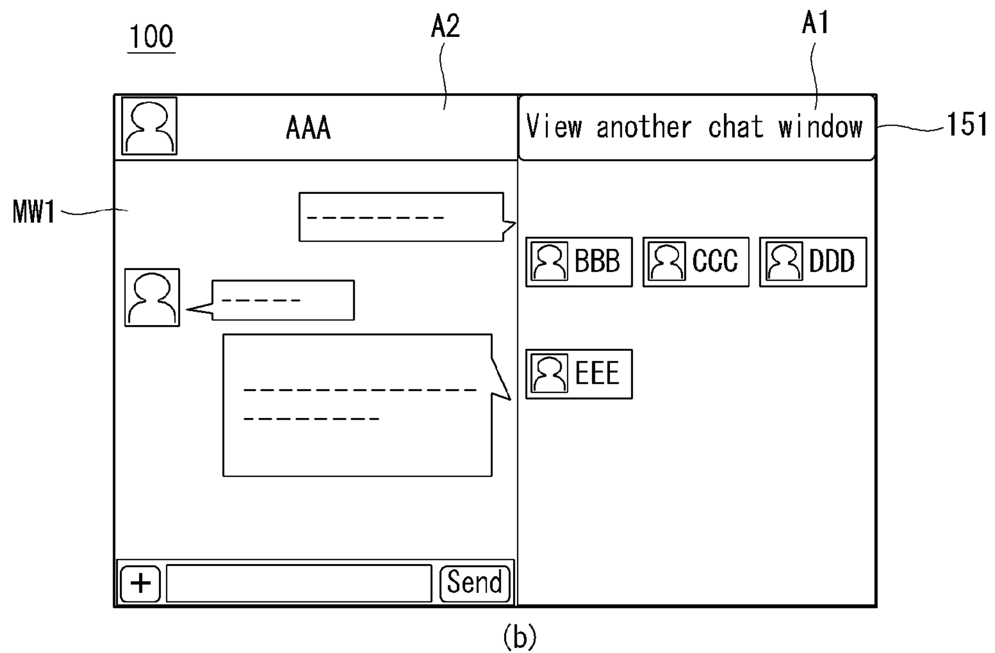

Referring to FIG. 26(*a*), when an 'another message window viewing' MENU2 item of menu items displayed in the first area is selected, the controller 180 executes a function of viewing another message window.

Further, when a function of viewing another message window is executed, the controller 180 controls to display the remaining message windows, except for the first message window MW1 displayed in a second area A2 of presently executing message windows in the first area, as shown in FIG. 26(*b*).

Figure 27:
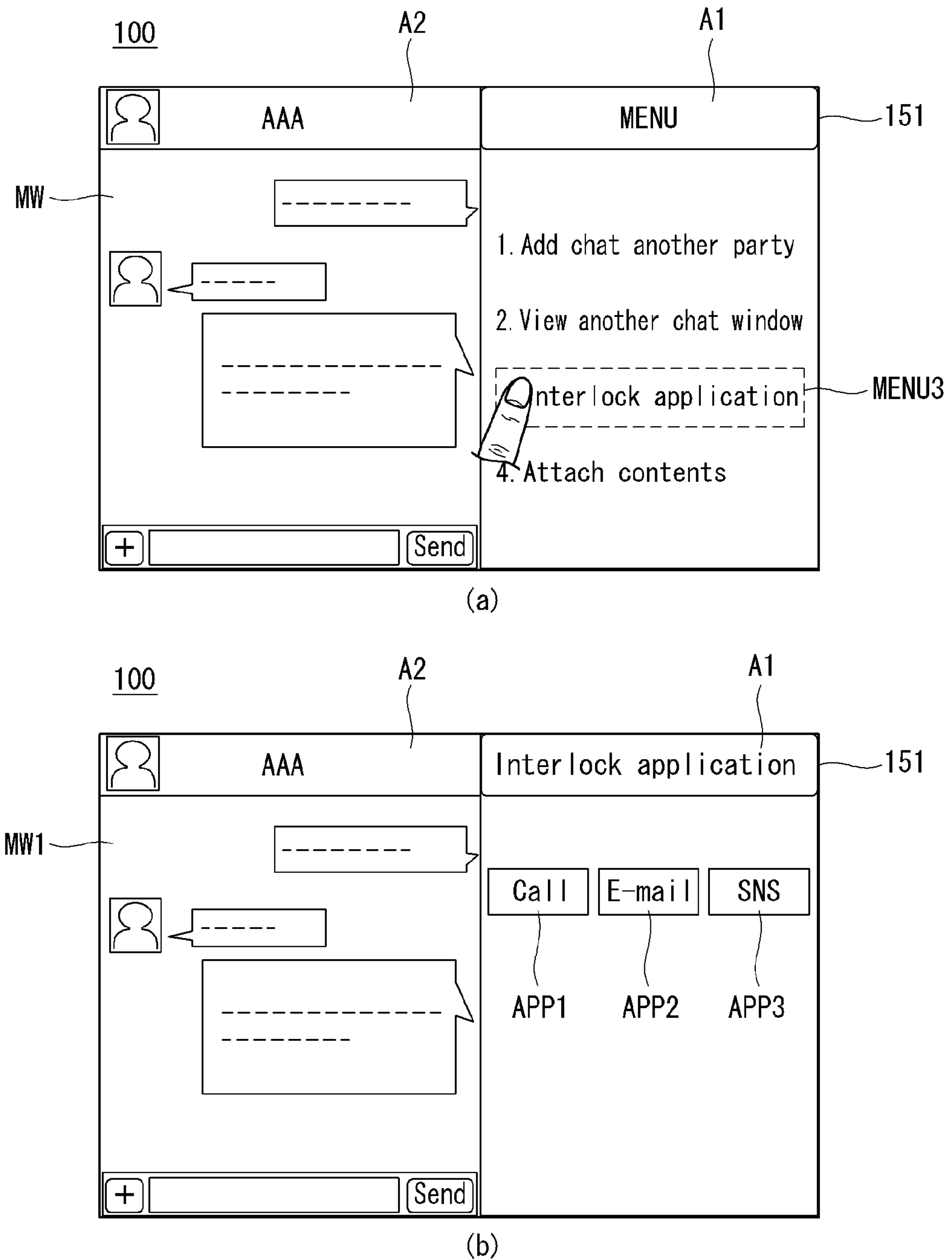

Referring to FIG. 27(*a*), when an 'application interlock' MENU3 item of menu items displayed in the first area is selected, the controller 180 executes an application interlocking function.

Further, when an application interlocking function is executed, the controller 180 controls to display applications that can be executed by interlocking with a message application in the first area, as shown FIG. 27(*b*).

Figure 28:
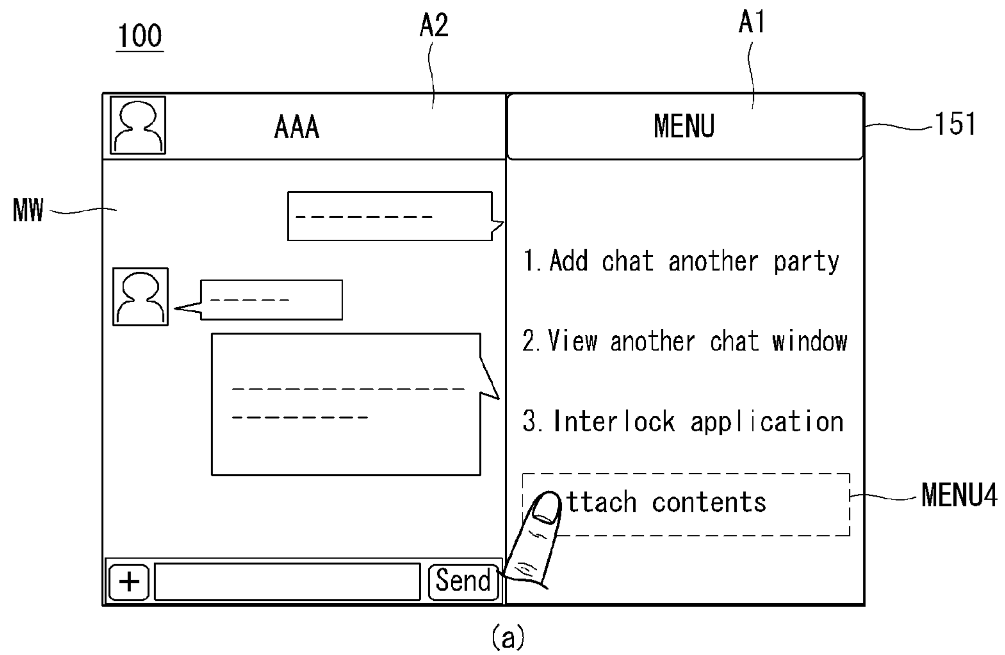
Figure 28:
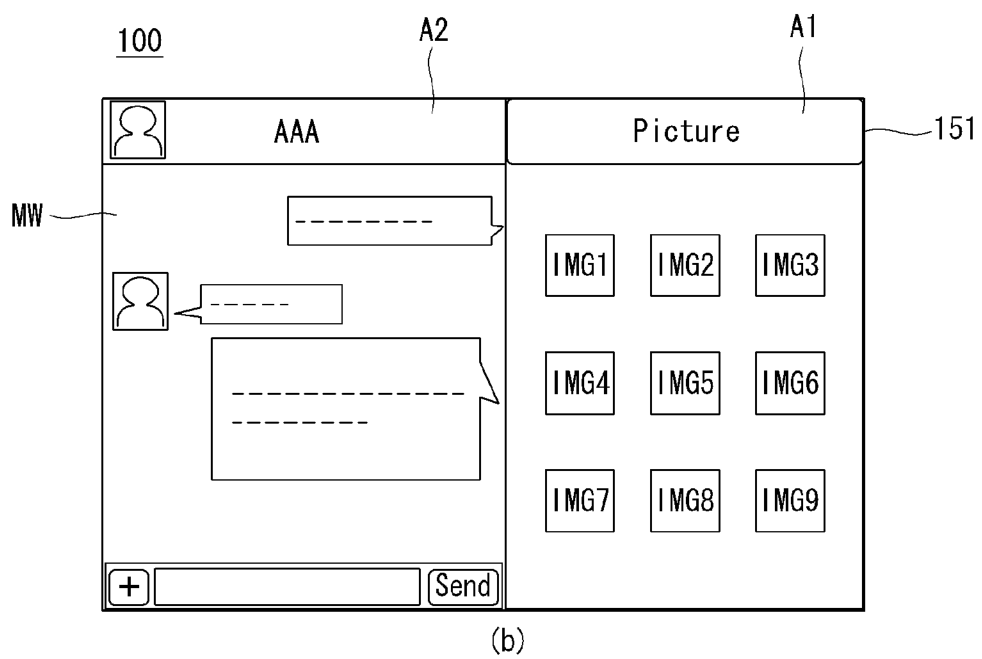

Referring to FIG. 28(*a*), when 'contents attaching' MENU4 item of menu items displayed in the first area is selected, the controller 180 executes a function of attaching contents.

When a function of attaching contents is executed, the controller 180 controls to display contents that can be attached to a message in the first area, as shown in FIG. 28(*b*).

Referring again to FIG. 5, when a view mode of the mobile terminal 100 is converted to a landscape view mode at step S102, a case of displaying at least one item related to a message application in a partial area of a display area is exemplified, but the present invention is not limited thereto.

According to the present invention, after a view mode of the mobile terminal 100 is converted to a landscape view mode, when a specific user input is received, the controller 180 may control to display at least one item related to a message application in a partial area of a display area.

Figure 29:
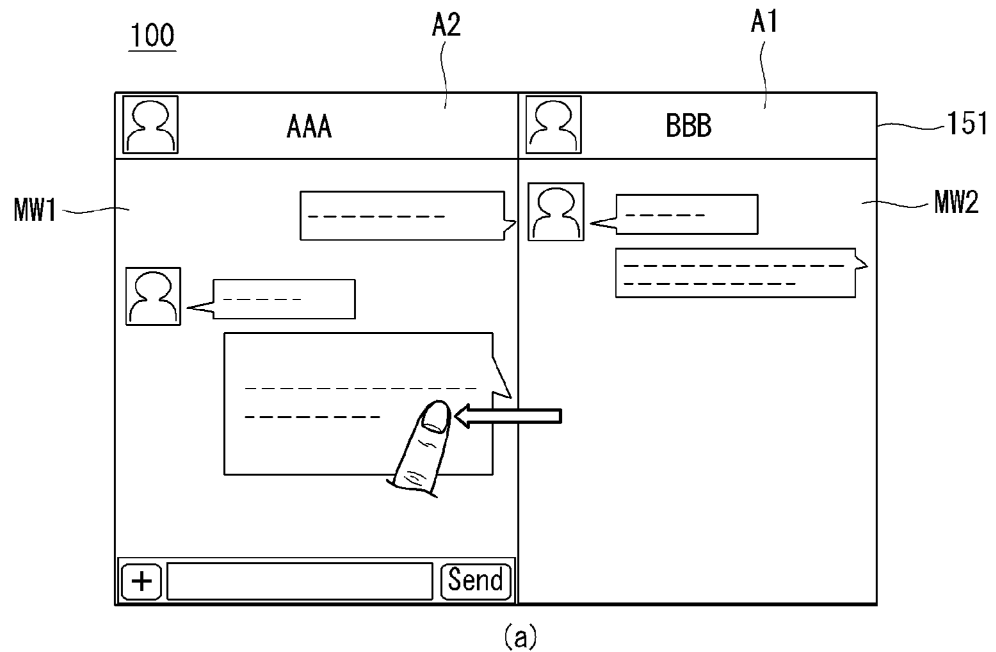
FIGS. 29 to 31 illustrate examples of a user input for displaying at least one item related to a message application in a partial area of a display area in a mobile terminal according to an exemplary embodiment of the present invention.
Figure 29:
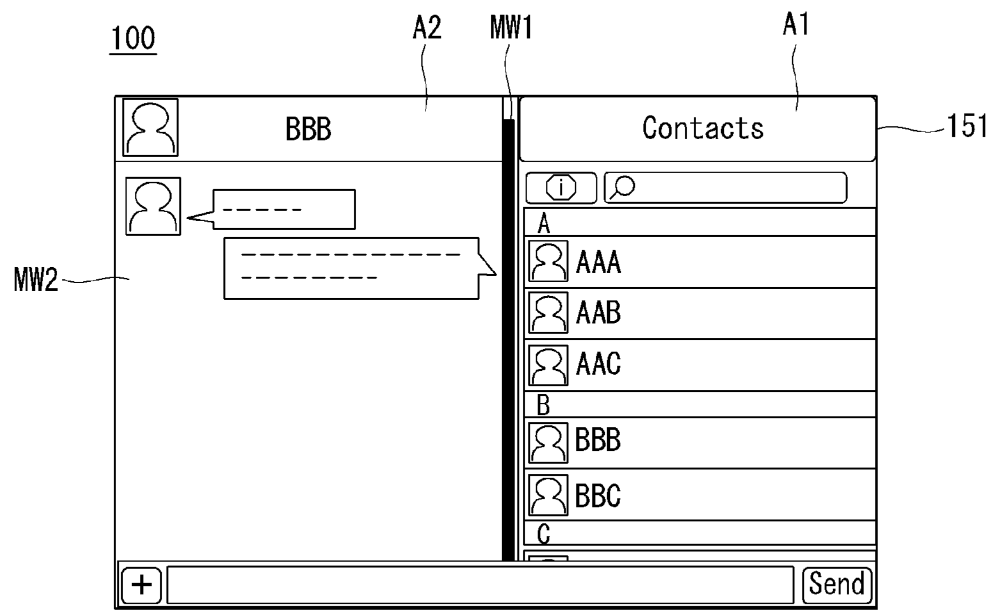
Figure 30:
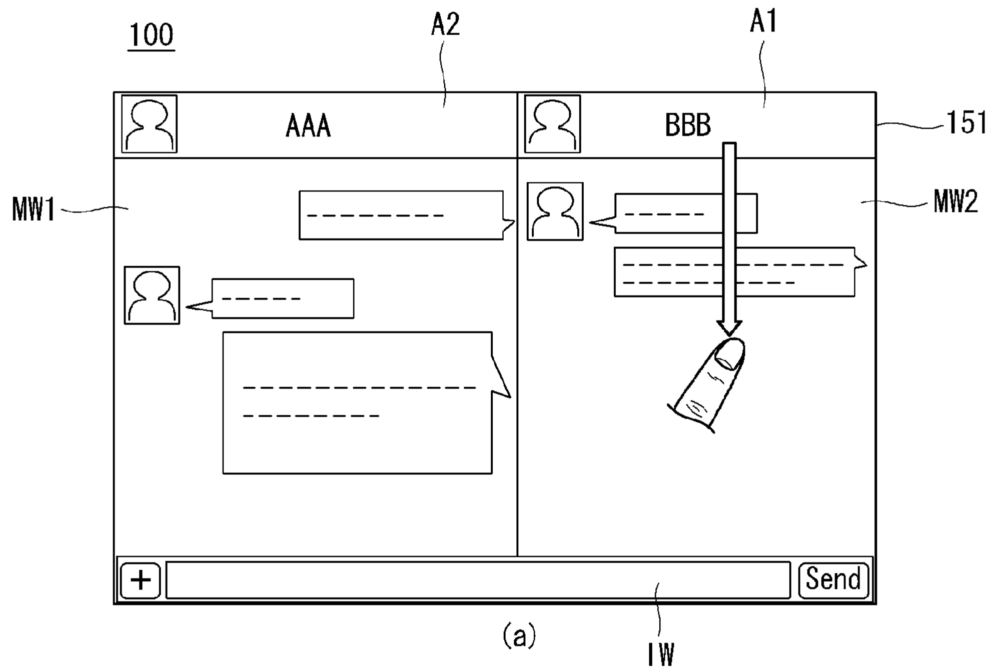
Figure 30:
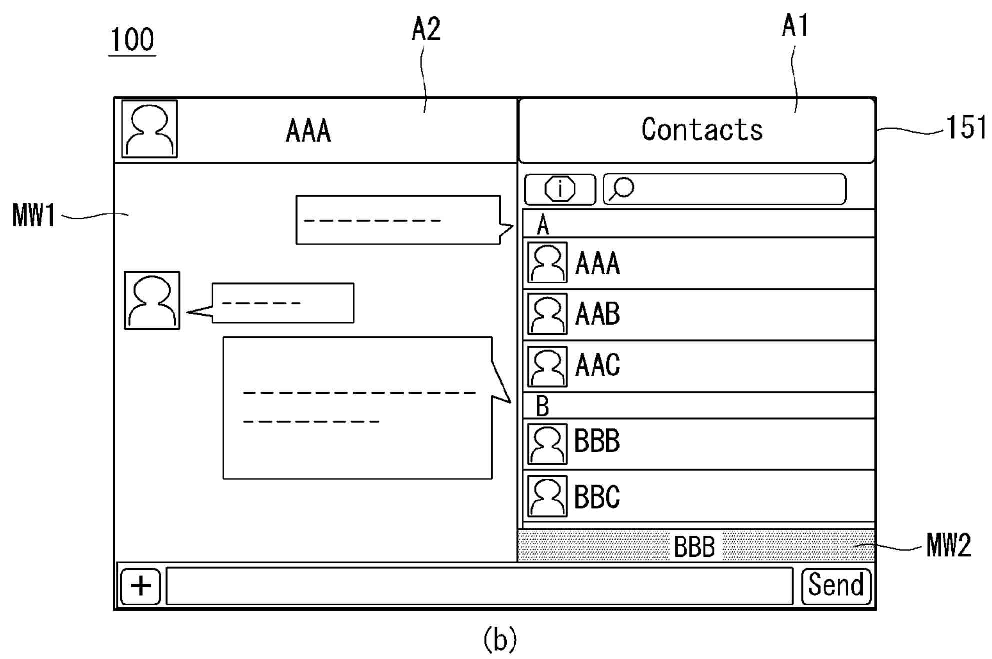
Figure 31:
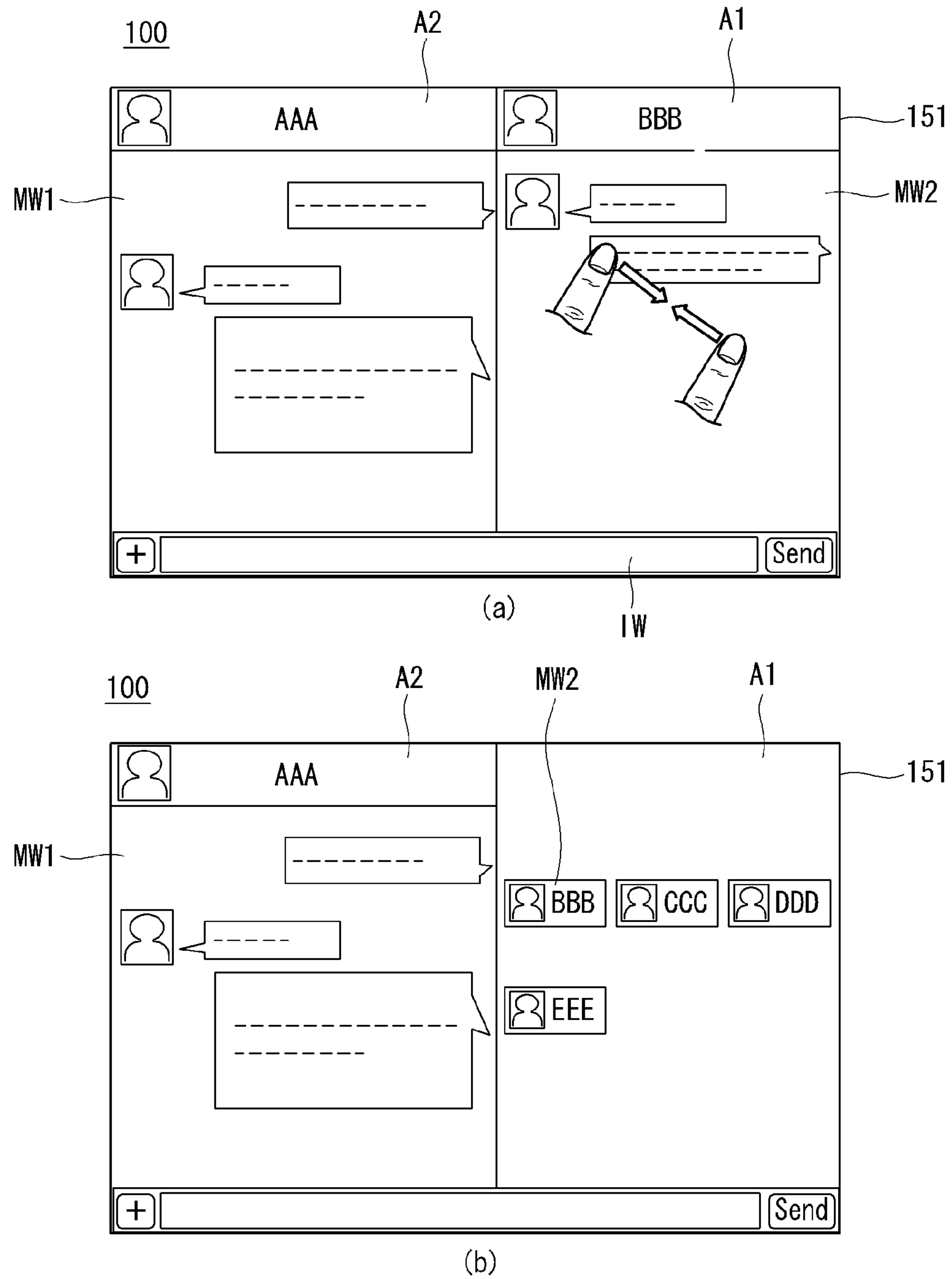

FIGS. 29 to 31 illustrate examples of a user input for displaying at least one item related to a message application in a partial area of a display area.

Referring to FIG. 29(*a*), the controller 180 divides the display area into a plurality of areas A1 and A2 in a landscape view mode. Further, when a plurality of message windows MW1 and MW2 are executed, the controller 180 controls to display different message windows MW1 and MW2 in divided areas A1 and A2, respectively.

Thereafter, when a user input of dragging the second message window MW2 displayed in one area A1 of divided areas to another area A2 is received, the controller 180 controls to overlappingly display the second message window MW2 on the first message window MW1 by moving the second message window MW2 to the second area A2, as shown in FIG. 29(*b*).

Further, the controller 180 controls to display at least one another party who can be added as chat another party instead of the second message window MW2 in the first area A1. Accordingly, the user can select any one another party in the first area A1 and add the another party as chat another party.

Referring to FIG. 30(*a*), the controller 180 divides the display area into a plurality of areas A1 and A2 in a landscape view mode. Further, when a plurality of message windows MW1 and MW2 are executed, the controller 180 controls to display different message windows MW1 and MW2 in divided areas A1 and A2, respectively.

Thereafter, when a user input of dragging in a direction of an input window IW is received by touching an upper end portion of the second message window MW2 displayed in one area A1 of divided areas, the controller 180 controls to minimize and display the second message window MW2, as shown in FIG. 30(*b*). That is, when a touch input of moving an upper end portion of the second message window MW2 downward is received, the controller 180 controls to display the second message window MW2 in a folded state.

Further, the controller 180 controls to display at least one another party that can be added as chat another party in the first area A1. Accordingly, the user can select one another party in the first area A1 and add the another party as chat another party.

When the second message window MW2 minimized and displayed in FIG. 30(*b*) is touched by the user or is dragged in an upper end direction of the screen, the second message window MW2 is returned to a state before a minimized state and is displayed.

Referring to FIG. 31(*a*), the controller 180 divides a display area into a plurality of areas A1 and A2 in a landscape view mode. Further, when a plurality of message windows MW1 and MW2 are executed, the controller 180 controls to display different message windows MW1 and MW2 in divided areas A1 and A2, respectively.

Thereafter, when a pinch-in input to one area A1 of divided areas is received, the controller 180 controls to display presently executing other message windows in the first area A1 other than the first message window MW1 while displaying in the second area A2, as shown in FIG. 31(*b*).

Accordingly, the second message window MW2 while displaying in the first area A1 is also displayed in the first area A1 in a short icon form.

In FIG. 31(*b*), when one message window while displaying in the first area A1 in a short icon form is selected by a user, the controller 180 controls to move the selected message window and to display the selected message window in the first area A1 or the second area A2.

FIGS. 29 to 31 illustrate a case where an item displayed in the first area is another party that can be added as chat another party or a movable message window, but the item may be embodied as an interlockable application, attachable contents, and selectable menu item.

According to an exemplary embodiment of the present invention, the controller 180 can simultaneously execute a plurality of message windows when adding chat another party based on a user input. Accordingly, it is necessary for the controller 180 to control to display message windows for easy movement between message windows.

According to an exemplary embodiment of the present invention, the controller 180 provides various display modes in order to efficiently display a plurality of message windows.

Figure 32:
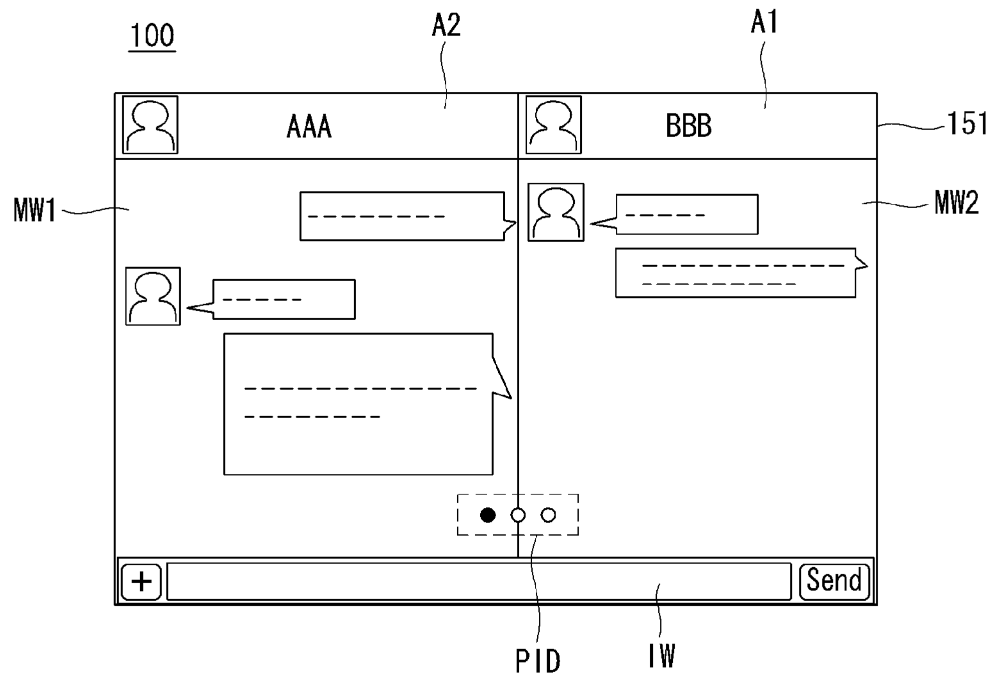
FIGS. 32 to 34 illustrate examples of displaying a plurality of message windows in a mobile terminal according to an exemplary embodiment of the present invention.
Figure 33:
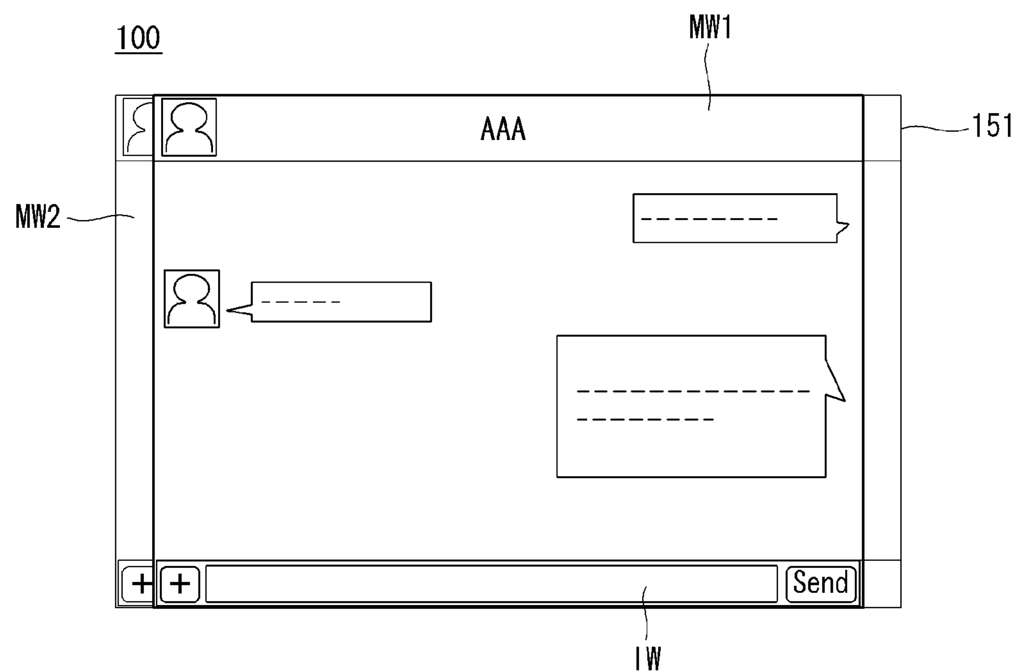
Figure 34:
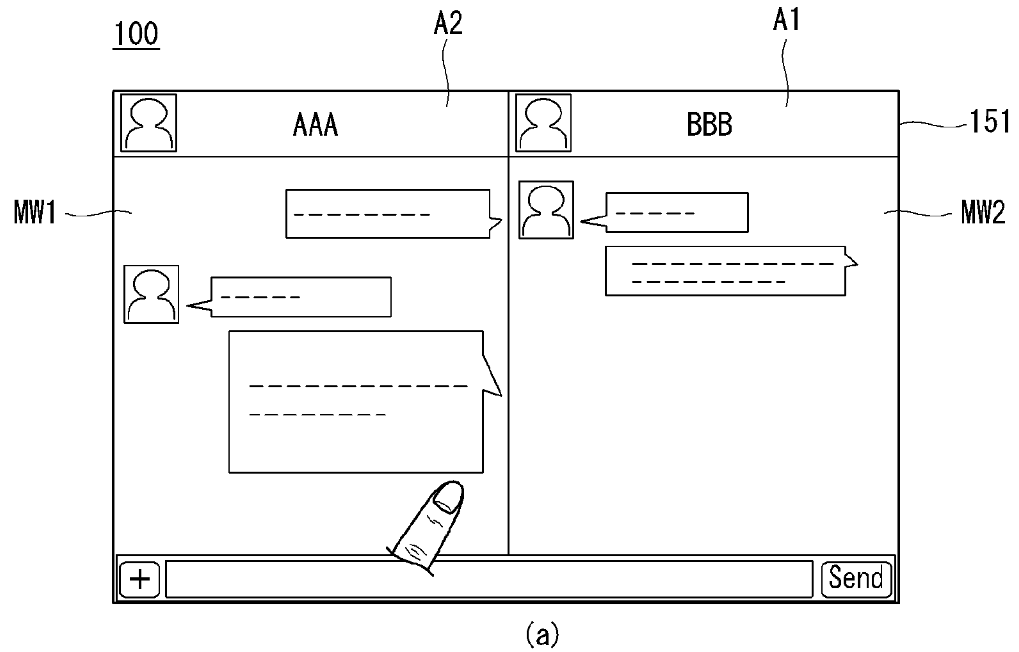
Figure 34:
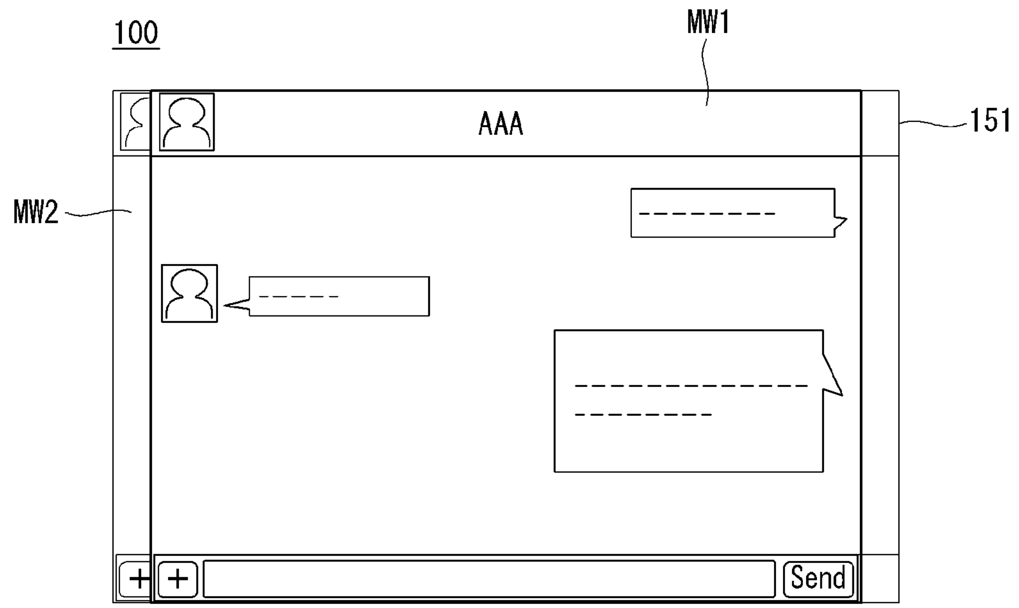

FIGS. 32 to 34 illustrate examples of displaying a plurality of message windows.

Referring to FIG. 32, the controller 180 controls to divide a display area into a plurality of areas A1 and A2 in a landscape view mode. Further, the controller 180 controls to display different message windows MW1 and MW2 in divided areas, respectively.

According to an exemplary embodiment of the present invention, even if a plurality of message windows are displayed on the screen, the controller 180 controls to display one input window IW, as shown in FIG. 32. Accordingly, the controller 180 controls to select one of the message windows MW1 and MW2 while displaying on the screen and to transmit a message input through the input window IW to only another party of the selected message window based on a user's selection input.

Further, according to an exemplary embodiment of the present invention, when the number of presently executing message windows is more than that of message windows that can be displayed on the screen, the controller 180 forms the screen into a plurality of pages and corresponds different message windows to each page.

Further, when the screen is formed with a plurality of pages, the controller 180 controls to display a page while displaying on a present screen using a page indicator PID indicating each page and to perform movement between pages using the page indicator, as shown in FIG. 32.

When one page indicator is touched, the controller 180 controls to move to a page corresponding to the touched page indicator.

Referring to FIG. 33, when a plurality of message windows MW1 and MW2 are executing, the controller 180 may control to overlappingly display message windows MW1 and MW2 instead of displaying message windows by dividing a display area.

When the message windows MW1 and MW2 are overlappingly displayed, only the message window MW1 displayed at the forefront is activated, and a message input through the input window IW is transmitted to another party of the message window MW1 at the forefront.

According to an exemplary embodiment of the present invention, a display mode disclosed in FIG. 32 and a display mode disclosed in FIG. 33 based on a user input can be converted.

Referring to FIG. 34(*a*), the controller 180 controls to divide a display area into a plurality of areas A1 and A2 in a landscape view mode and to display different message windows MW1 and MW2 in divided areas, respectively.

Thereafter, when the display area is touched for a predetermined time period or more, the controller 180 controls to overlappingly display message windows MW1 and MW2 instead of dividing and displaying a display area, as shown in FIG. 34(*b*).

According to an exemplary embodiment of the present invention, when a plurality of message windows are executing, movement between message windows can be performed by various methods.

FIGS. 35 to 39 illustrate examples in which a user selects a message window through movement between message windows.

Figure 35:
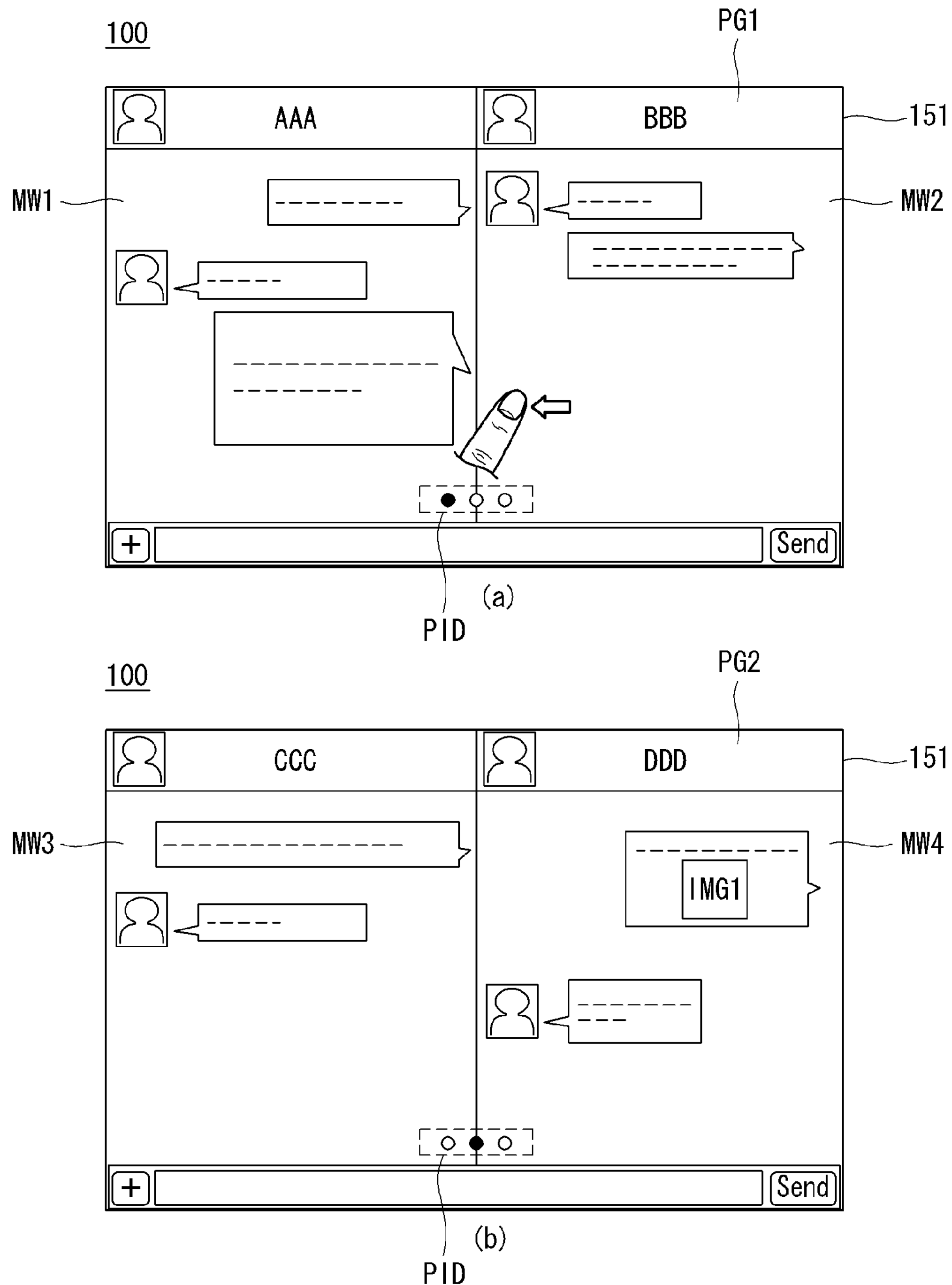
FIGS. 35 to 39 illustrate examples in which a user selects a message window through movement between message windows in a mobile terminal according to an exemplary embodiment of the present invention.

FIG. 35 illustrates an example of performing movement between message windows using a method of moving a page through flicking.

Referring to FIG. 35(*a*), when the number of presently executing message windows is more than that of message windows that can be displayed on a screen, the controller 180 forms the screen with a plurality of pages corresponding to different message windows.

Further, the controller 180 controls to display one page PG1 of a plurality of pages corresponding to different message windows on a screen based on a user input. That is, accordingly, the controller 180 controls to display message windows MW1 and MW2 corresponding to the page PG1 on the screen.

Thereafter, when flicking input is received, the controller 180 controls to convert a page and to display message windows MW3 and MW4 corresponding to the converted page PG2 on the screen, as shown in FIG. 35(*b*).

When message windows are divided into a plurality of pages, the controller 180 controls to display a presently displaying page using a page indicator PID indicating each page, as shown in FIG. 35(*b*).

Further, when one page indicator is touched, the controller 180 controls to move to a page corresponding to the touched page indicator. That is, the controller 180 controls to display message windows corresponding to a page corresponding to the touched page indicator on the screen.

FIG. 35 illustrates a case of using a page indicator or flicking for movement between pages when message windows are divided into a plurality of pages, but the present invention is not limited thereto. According to the present invention, the controller 180 may perform movement between pages by other kinds of user inputs.

For example, when a body or a display area of the mobile terminal 100 is tapped by the user, the controller 180 controls to move to another page based on a tapped position. In this case, the controller 180 controls to change a page to move according to a tapping position, such as movement to a previous page when a left body of the screen is tapped and movement to a next page when a right body of the screen is tapped.

Figure 36:
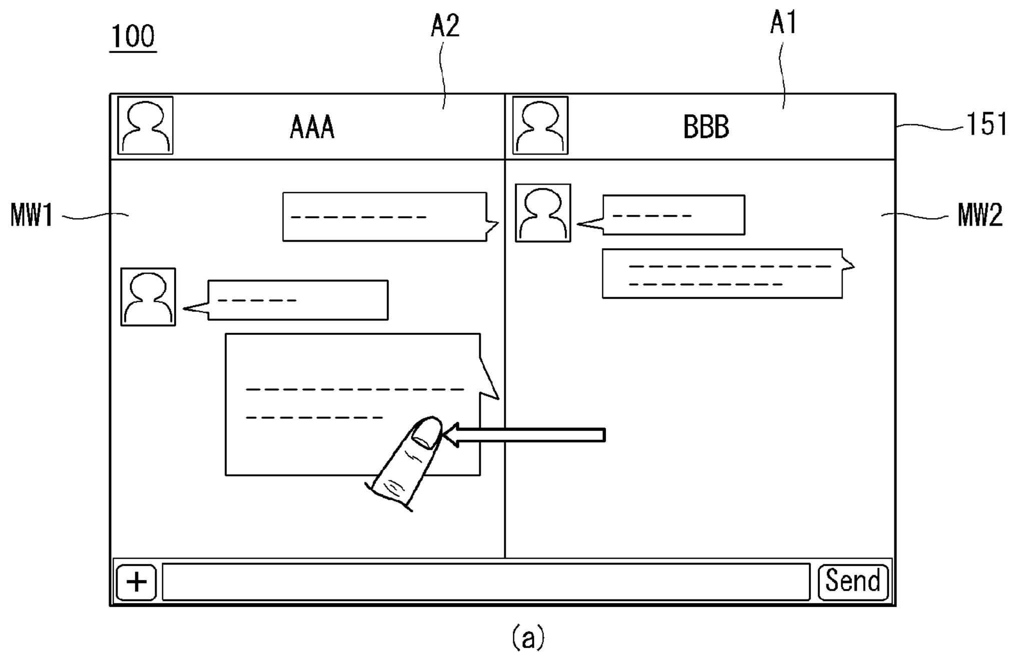
Figure 36:
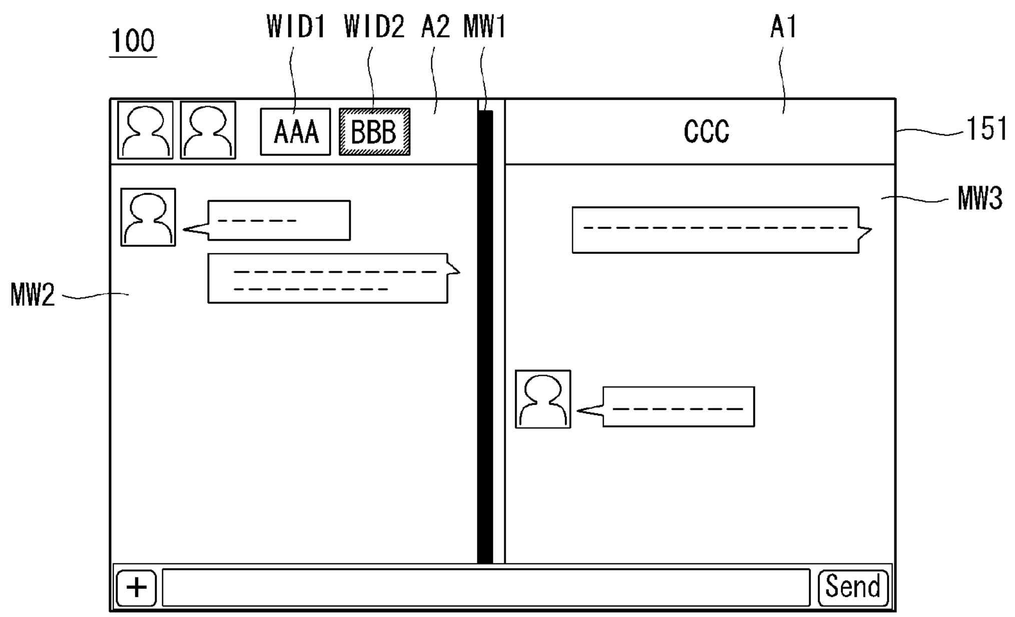

FIG. 36 illustrates an example of performing movement between message windows using a method of overlapping message windows to any one area.

Referring to FIG. 36(*a*), the controller 180 controls to display different message windows MW1 and MW2 to divided areas A1 and A2, respectively.

Thereafter, when a user input of dragging the second message window MW2 displayed in the first area to the second area A2 is received, the controller 180 controls to move and display the second message window MW2 to the second area A2, as shown in FIG. 36(*b*). That is, the controller 180 controls to overlappingly display the second message window MW2 on the first message window MW1.

Further, the controller 180 calls a presently executing another message window MW3 and controls to display the message window MW3 in the first area A1 instead of the second message window MW2.

As shown in FIG. 36(*b*), when a plurality of message windows are overlappingly displayed, the controller 180 controls to group another parties of overlappingly displayed message windows as one group. Further, the controller 180 transmits and receives a message to the grouped another parties as a group or transmits and receives a message as one to one based on a user's control input.

As shown in FIG. 36(*b*), when a plurality of message window are overlappingly displayed, the controller 180 controls to move a message window through a touch input of an area in which message windows are overlappingly displayed.

For example, the controller 180 may control to change a message window displayed at the forefront of overlapped message windows MW1 and MW2 based on flicking and tapping of the second area A2.

Further, when a plurality of message windows are overlappingly displayed, the controller 180 may control to display at least a partial area of each overlapped message window on the screen and to move the at least a partial area to a message window touched by the user.

For example, as shown in FIG. 36(*b*), in a state where the second message window MW2 is displayed at the forefront on the screen, when the first message window MW1 in which a portion is displayed on the screen is touched, the controller 180 controls to move to the first message window MW1. Accordingly, in the second area A2, the first message window MW1 is displayed at the forefront.

Further, when a plurality of message windows are overlappingly displayed, the controller 180 controls to display indicators WID1 and WID2 corresponding to each message window overlappingly displayed in an upper end portion of the screen.

The controller 180 activates or inactivates a corresponding message window based on a touch input to each of the indicators WID1 and WID2. Further, the controller 180 may control to perform movement between message windows based on a touch input to each of the indicators WID1 and WID2.

Figure 37:
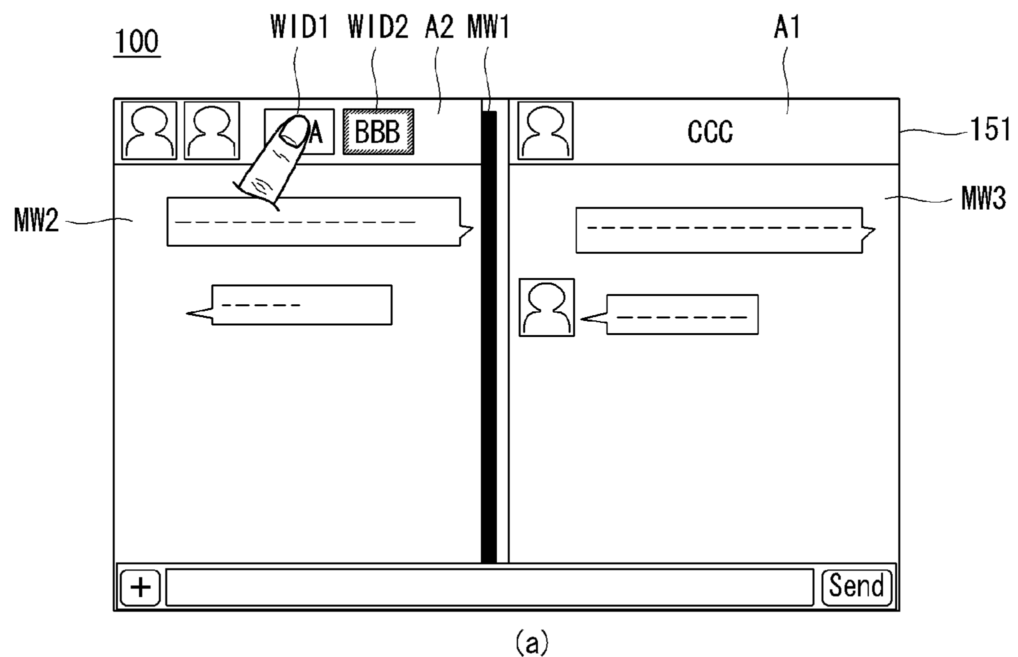
Figure 37:
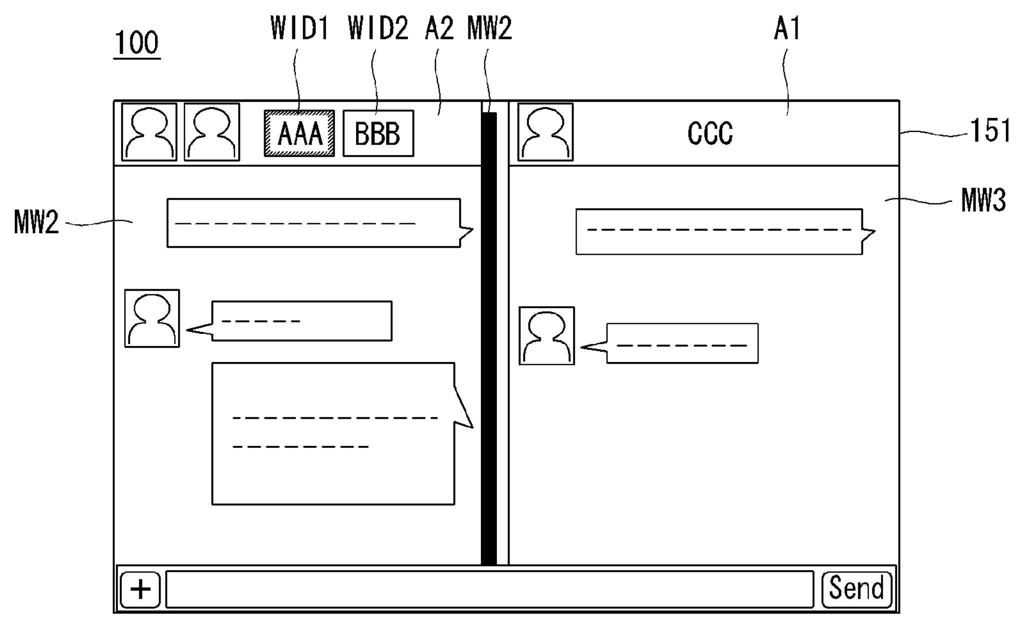

FIG. 37 illustrates an example of performing movement between message windows overlappingly displayed using a message window indicator.

For example, in FIG. 37, the controller 180 controls to display indicators WID1 and WID2 corresponding to different message windows MW1 and MW2 overlappingly displayed in an upper end portion of the screen, as shown in FIG. 37(*a*).

When one indicator WID1 displayed in an upper end portion of the screen is touched, the controller 180 controls to move to the message window MW1 corresponding to the indicator WID1, as shown in FIG. 37(*b*). That is, the controller 180 controls to display the message window MW1 corresponding to the touched indicator WID1 at the forefront.

As shown in FIG. 37, when an indicator corresponding to different message windows is displayed in an upper end portion of the screen, the controller 180 controls to highlight and display an indicator corresponding to a message window displayed at the forefront so that a user can intuitively determine a message window while presently displaying at the forefront.

Further, when controlling activation of a message window using a message window indicator, in order for the user to intuitively determine a state of each message window, i.e., in order to intuitively determine a message window in a presently activation state, the controller 180 may control to highlight and display an indicator corresponding to a message window in an activation state.

According to an exemplary embodiment of the present invention, activation of a message window represents a message window with another party selected as a target to transmit a message input through a message window, i.e., a present input window for displaying a message input through the input window IW.

Figure 38:
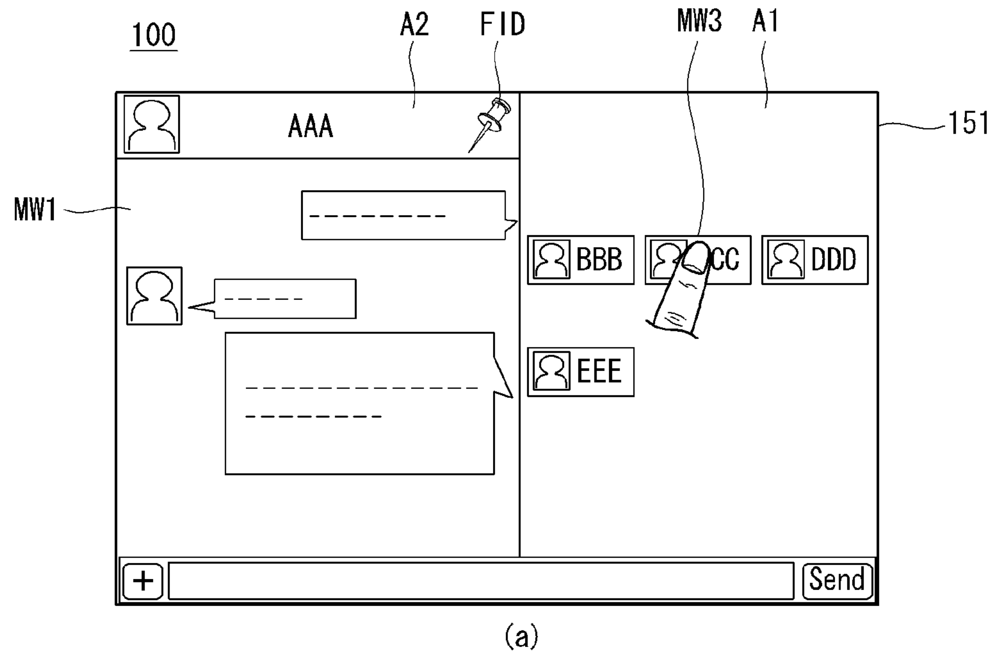
Figure 38:
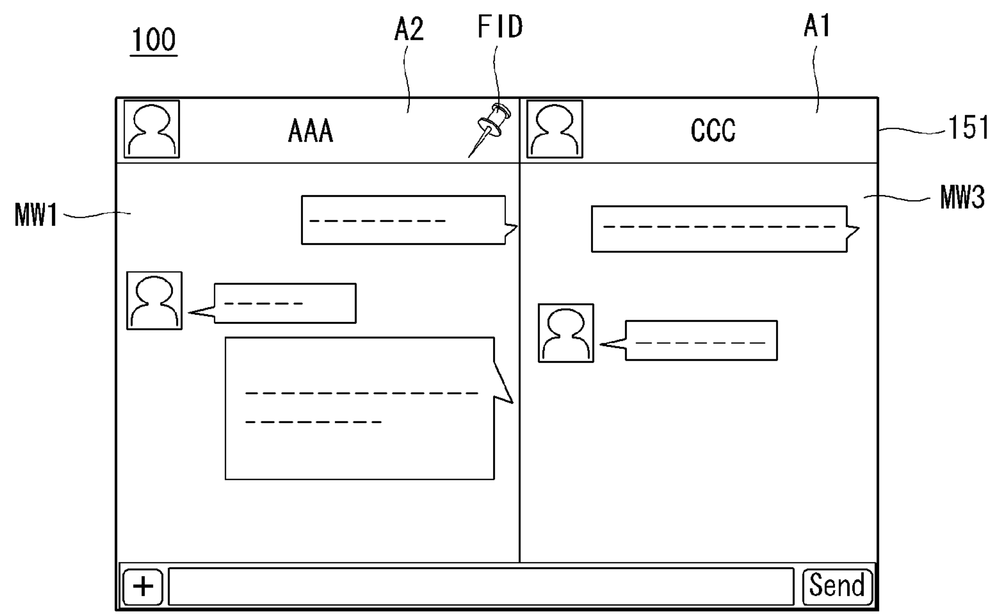

FIG. 38 illustrates an example of performing movement between message windows using a method of aligning and displaying movable message windows in a partial area of a screen.

Referring to FIG. 38(*a*), the controller 180 controls to display at least one movable message windows in the first area based on a user input.

Further, when one message window MW3 of message windows while displaying in the first area is selected by the user, the controller 180 controls to display the selected message window in the first area A1, as shown in FIG. 38(*b*).

According to an exemplary embodiment of the present invention, the controller 180 may control to fix and display one message window to a present position based on a user input. In this case, when a user input that requests fixing of a specific message window is received, the controller 180 controls to continue to display the selected message window at a present position. Further, as shown in FIG. 38, the controller 180 may control to display an indicator FID representing that a corresponding message window is fixedly displaying in an upper end portion of the message window.

When one message window is fixed, until fixing of the message window is released, even if page movement is requested or message window movement is requested, the controller 180 does not change a display of the fixed message window. Further, even if a message window is newly added, a display of the fixed message window may not change.

Figure 39:
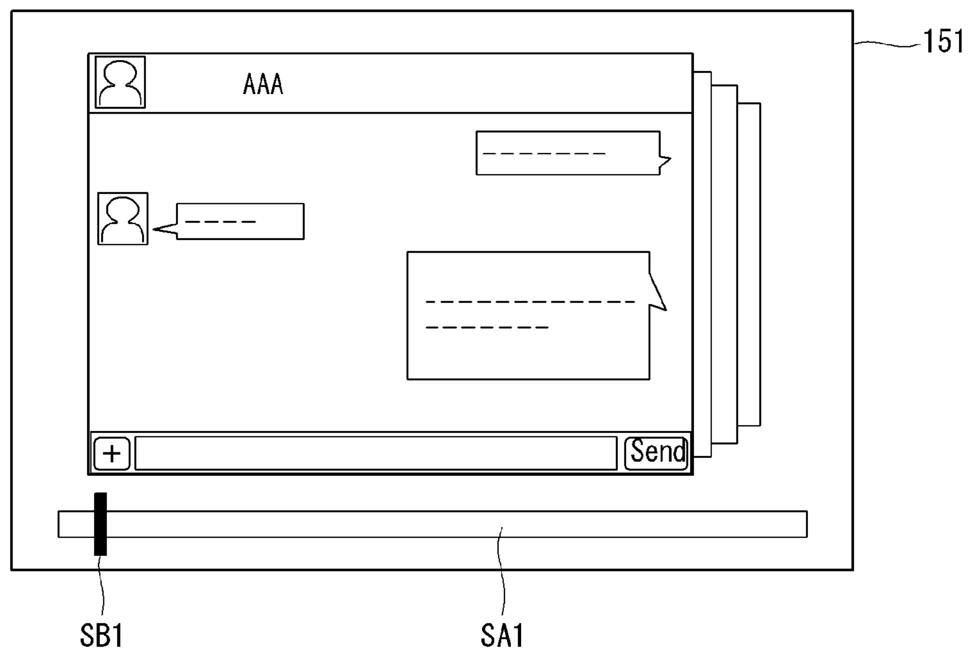

FIG. 39 illustrates an example of performing movement between message windows using a scroll bar.

Referring to FIG. 39, even if the mobile terminal operates in a landscape view mode, the controller 180 controls to display a plurality of message windows with a method of overlappingly displaying message windows without divide of a display area.

When a plurality of message windows are overlappingly displayed, the controller 180 controls to display a scroll bar SB1 for controlling message window movement and to change a message window displayed at the forefront based on a position of the scroll bar SB1.

In FIG. 39, a position of the scroll bar SB1 within a scroll area SA1 corresponds to a position or an order of a message window presently displayed at the forefront among entire message windows. Accordingly, by dragging the scroll bar SB1 within the scroll area SA1, the user can convert a message window displayed at the forefront on a present screen.

In an exemplary embodiment of the present invention, in a state where an executing message window is plural, when a new message is received in one message window, an indicator notifying that a new message is received may be displayed in order for the user to easily recognize that a new message is received. Further, the user may be easily moved to a message window in which a new message is received using an indicator indicating reception of a new message.

Figure 40:
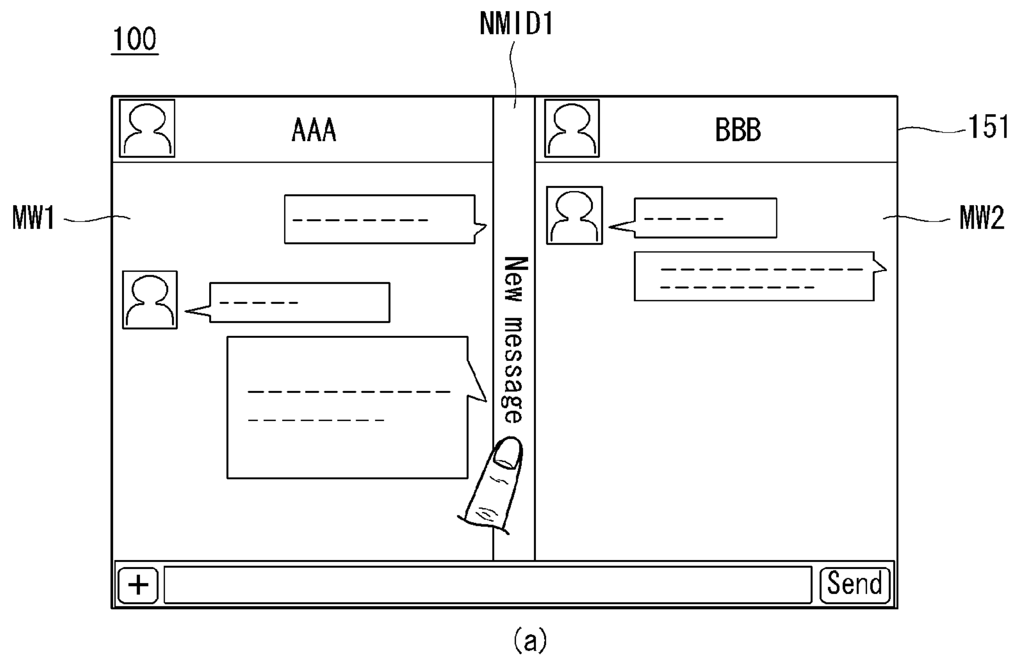
FIG. 40 illustrates an example of performing movement between message windows using an indicator guiding that a new message is received in a mobile terminal according to an exemplary embodiment of the present invention.
Figure 40:
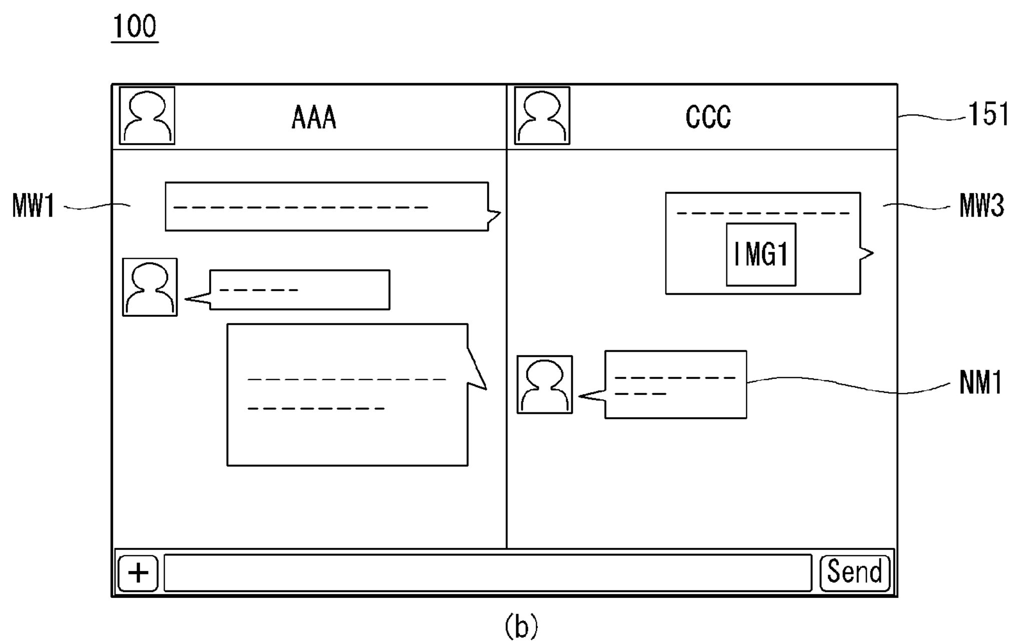

FIG. 40 illustrates an example of performing movement between message windows using an indicator guiding that a new message is received.

Referring to FIG. 40(*a*), when a new message is received, the controller 180 controls to highlight and display an indicator NMID1 for guiding that a new message received in a partial area of a screen for a predetermined time period.

Further, when the indicator NMID1 for guiding that a new message is received is touched by the user, the controller 180 controls to move to a message window MW3 in which a new message is received, as shown in FIG. 40(*b*). That is, the controller 180 calls the message window NW3 in which a new message is received and controls to display the message window NW3 on the screen and to display a newly received message NM1 within the message window MW3.

According to an exemplary embodiment of the present invention, when a presently executing message window is plural, the controller 180 may share a message between message windows, or share another party information between message windows.

Figure 41:
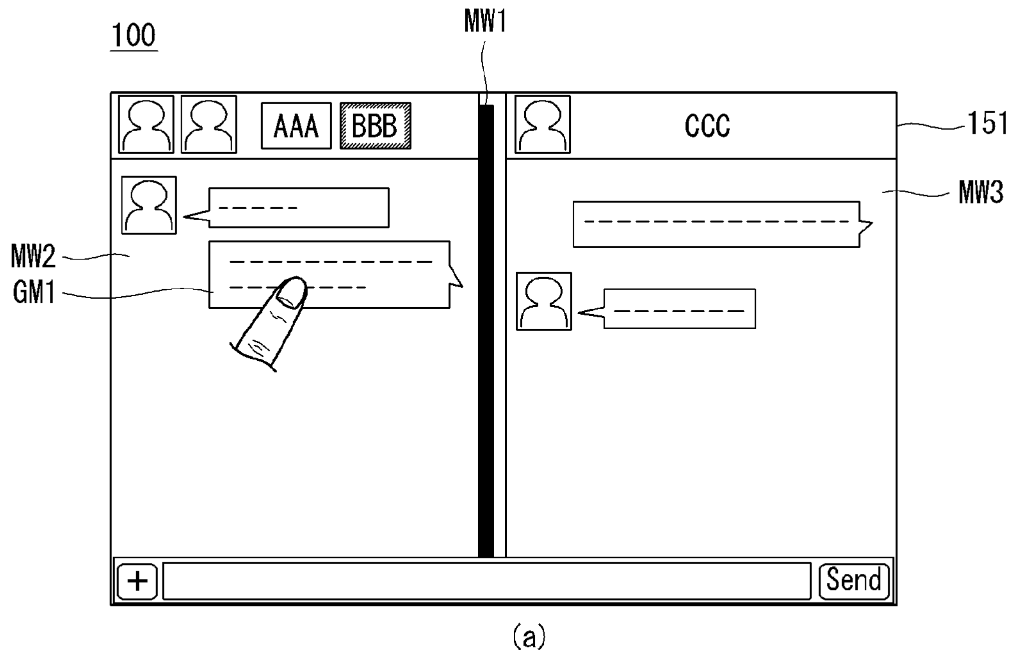
FIGS. 41 to 43 illustrate examples in which message windows share a message and another party information in a mobile terminal according to an exemplary embodiment of the present invention.
Figure 41:
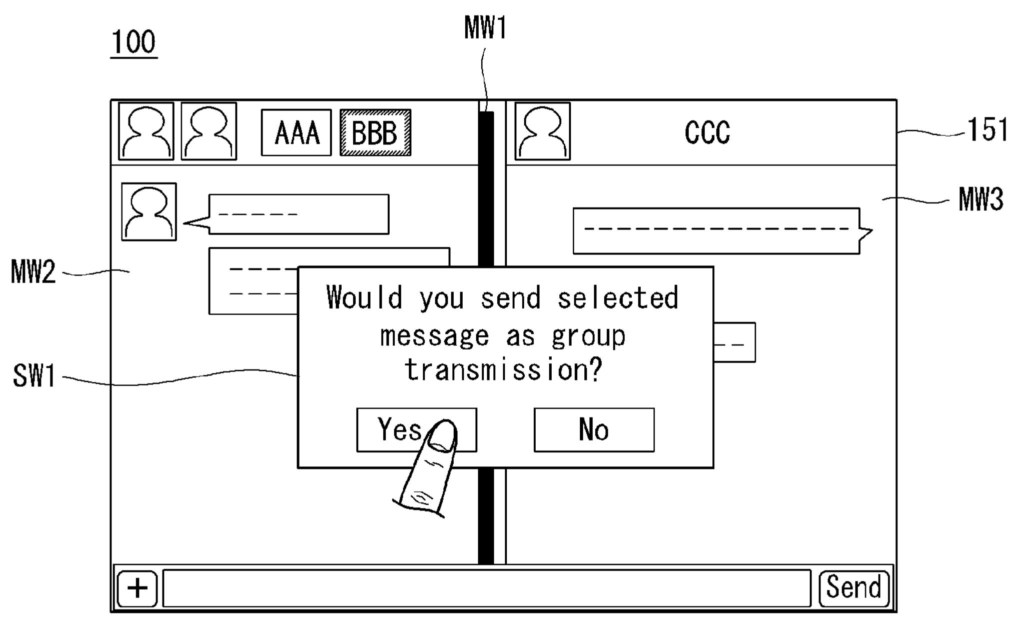
Figure 42:
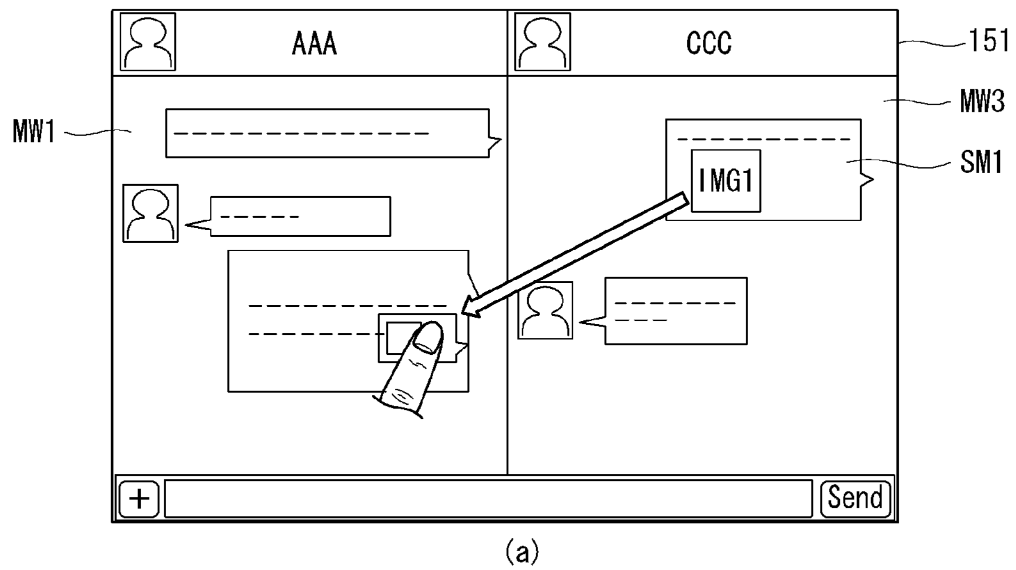
Figure 42:
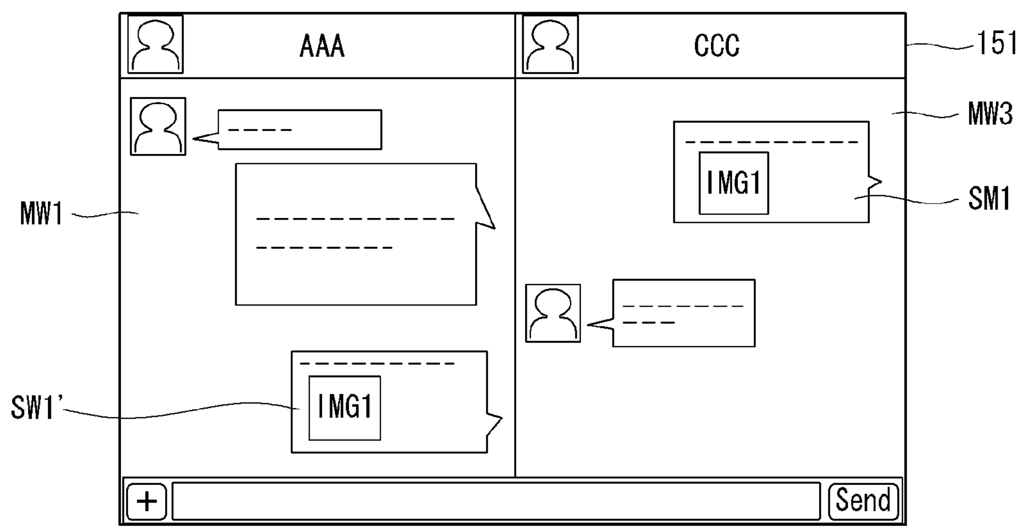
Figure 43:
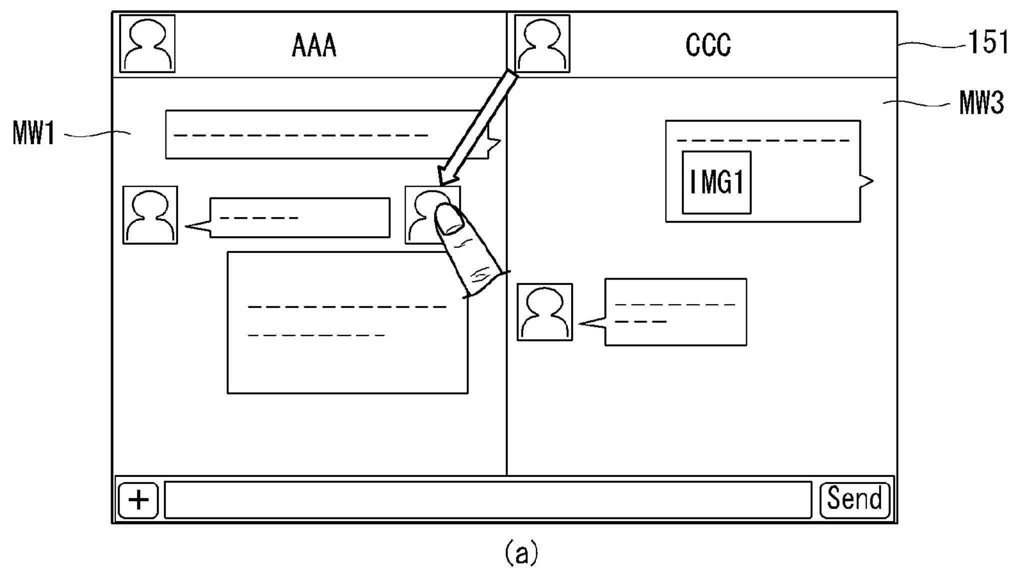
Figure 43:
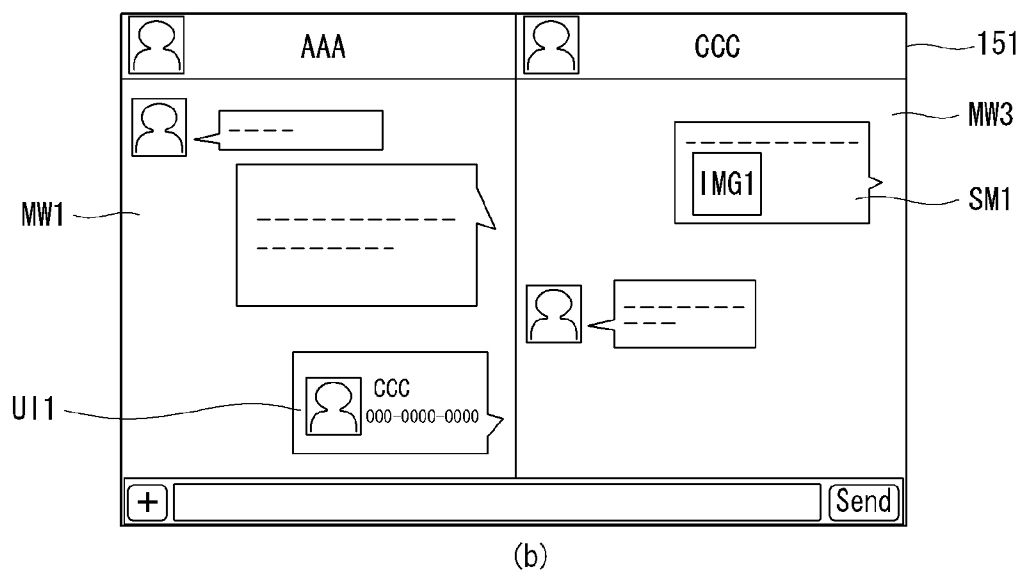

FIGS. 41 to 43 illustrate examples in which message windows share a message and another party information.

Referring to FIG. 41(*a*), the controller 180 groups a plurality of message windows overlappingly displayed in the second area A2 as a group.

Thereafter, when a message GM1 displayed in one message window MW2 of grouped message windows is pressed for a predetermined time period or more, the controller 180 controls to display a selection window SW1 for selecting whether to send the selected message GM1 as a group to another parties AAA and BBB of grouped message windows MW1 and MW2, as shown in FIG. 41(*b*).

Further, the controller 180 determines whether to send a pressed message GM1 as a group based on a selection input that is input through the selection window SW1.

Referring to FIG. 42(*a*), when a user input of dragging one message SM1 displayed in a third message window MW3 to the first message window MW1 is received, the controller 180 transmits the same message SM1' as the dragged message to another party of the first message window MW1, as shown in FIG. 42(*b*). Further, the controller 180 controls to display the same message SM1' as the dragged message in the first message window MW1.

According to an exemplary embodiment of the present invention, when the dragged message is a message including an attached file, the controller 180 transmits an attached file included within a corresponding message to another party of the dragged message window MW1.

Referring to FIG. 43(*a*), the controller 180 controls to display another party information of each of the message windows MW1 and MW3 in an upper end portion of the screen of each of the message windows MW1 and MW3. Here, the another party information may be displayed using a picture, a name, nickname, and ID of corresponding another party.

When a user input of dragging another party information displayed in an upper end portion of a screen of the third message window MW3 to the first message window MW1 is received, the controller 180 transmits a message UI1 including another party information of a third another party CCC to another party of the first message window MW1, as shown in FIG. 43(*b*). Further, the controller 180 controls to display the message UI1 including another party information of the third another party CCC in the first message window MW1.

Further, according to an exemplary embodiment of the present invention, when a presently displaying message window is plural, the controller 180 may couple messages displayed in message windows and use the coupled message when transmitting a message.

Figure 44:
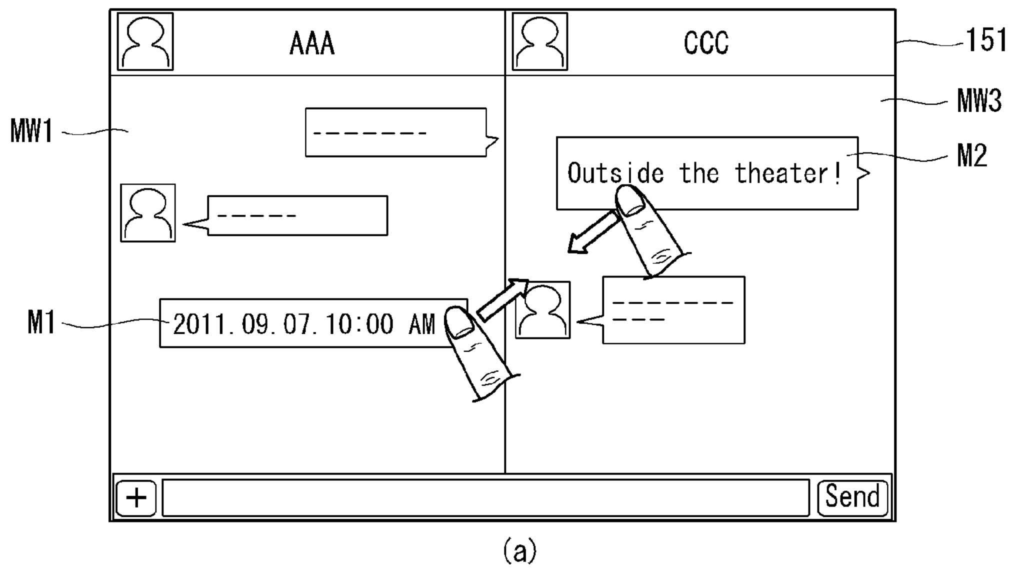
FIG. 44 illustrates an example of coupling messages of different message windows in a mobile terminal according to an exemplary embodiment of the present invention.
Figure 44:
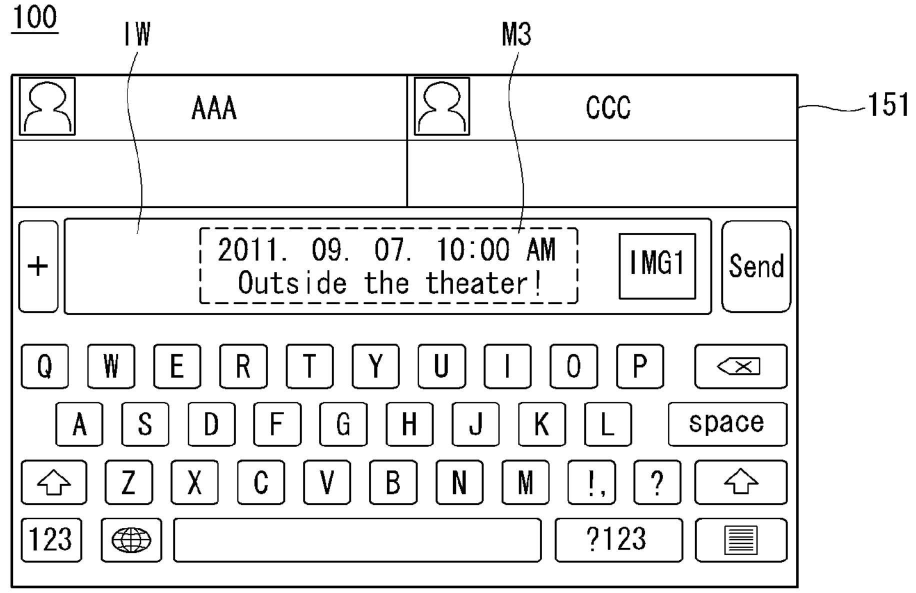

FIG. 44 illustrates an example of coupling messages of different message windows.

Referring to FIG. 44(*a*), when a user input of pinching in a first message M1 displayed in the first message window MW1 and a second message M2 displayed in the third message window MW3 is received, the controller 180 inputs a message M3 in which two messages M1 and M2 are coupled to an input window IW, as shown in FIG. 44(*b*).

Accordingly, the user can appropriately edit the coupling message M3 input to the input window IW and use the coupling message M3 upon transmitting.

According to an exemplary embodiment of the present invention, the coupling message M3 input to the input window IW may be transmitted to another party selected by the user or may be transmitted as a group to another parties of message windows MW1 and MW3 in which messages before being coupled are displayed.

Further, according to an exemplary embodiment of the present invention, in order to minimize an area in which an input window occupies on a screen of the message window and to improve user convenience, the controller 180 enables the user to set a size and a position of the input window.

Figure 45:
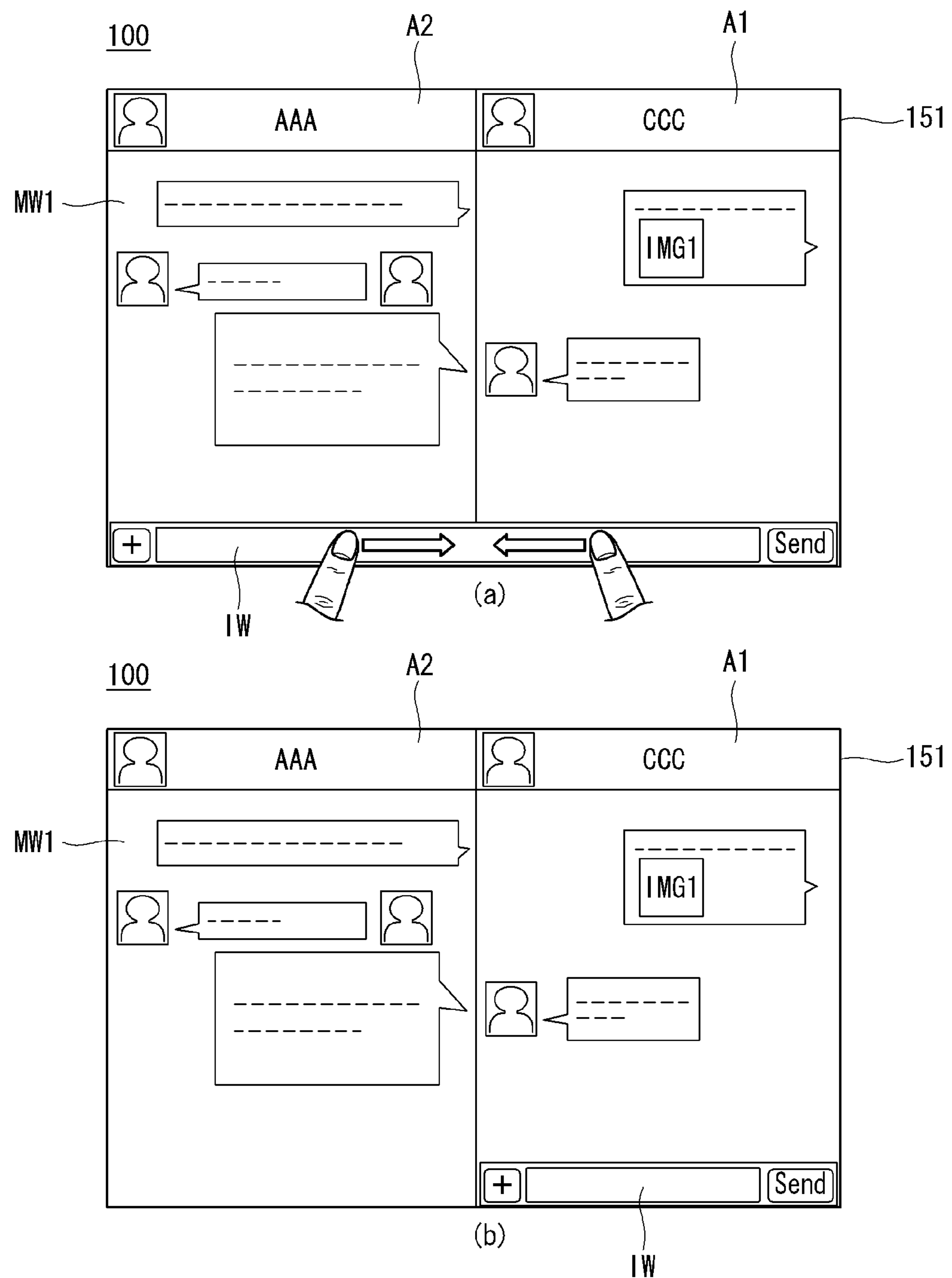
FIG. 45 illustrates an example of varying an input window in a mobile terminal according to an exemplary embodiment of the present invention.

FIG. 45 illustrates an example of varying an input window.

Referring to FIG. 45(*a*), when a pinch-in input of the input window IW is received, the controller 180 controls to reduce and display the input window IW, as shown in FIG. 45(*b*). Further, the controller 180 controls to display the reduced input window IW to only one area of divided areas.

As shown in FIG. 45, when a display position and a display size of an input window are varied, a position and size of the keypad displayed on the screen upon selecting the input window may be also varied.

Figure 46:
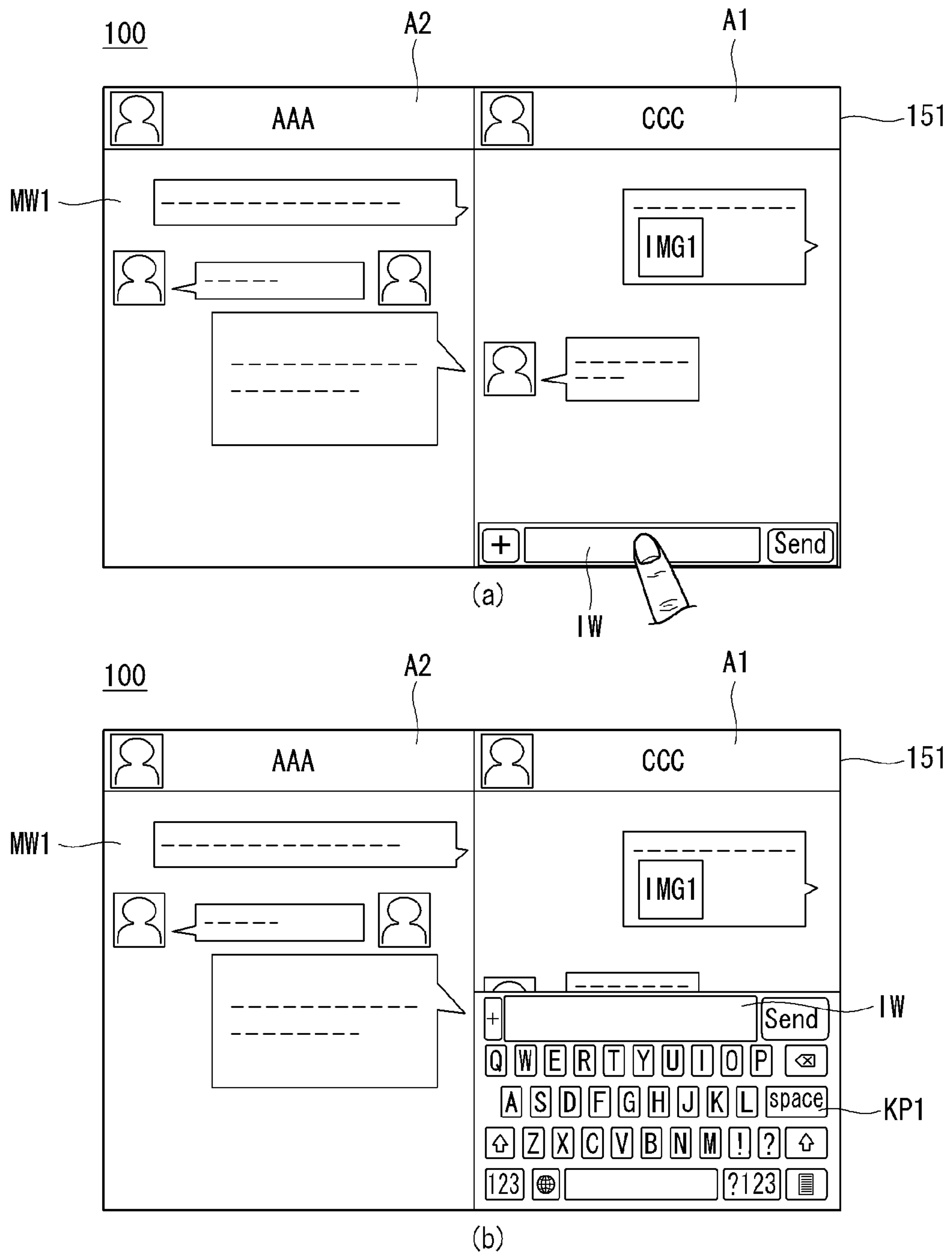
FIG. 46 illustrates an example in which a position and size of a keypad are varied as an input window is varied in a mobile terminal according to an exemplary embodiment of the present invention.

FIG. 46 illustrates an example in which a position and size of a keypad are varied as an input window is varied.

Referring to FIG. 46(*a*), when the input window IW displayed in the first area A1 is touched, the controller 180 controls to display a keypad KP1 for inputting a message in only the first area, as shown in FIG. 47(*b*).

According to an exemplary embodiment of the present invention, in order to minimize to cover the message window, the input window and the keypad may be displayed in a translucent state. When the input window and the keypad are displayed in a translucent state, a transparent degree may be also set by a user.

According to an exemplary embodiment of the present invention, when the user attempts to add chat another party, the user can enter a mode for adding chat another party with only a simple manipulation that converts a view mode. Further, in a landscape view mode, by displaying a message window and a list of another parties that can be added on one screen, the user can simply add chat another party while viewing a presently executing chat situation.

Further, when alternately transmitting and receiving a message with a plurality of another parties, movement between message windows can be easily performed, and when performing operation of executing another application or attaching contents while executing a message application, user convenience is improved.

The disclosed control method for the mobile terminal may be written as computer programs and may be implemented in digital microprocessors that execute the programs using a computer readable recording medium. The control method for the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A mobile terminal comprising:

a touchscreen; and a controller configured to:

execute a message application; and control the touchscreen to:

display a contact list comprising a plurality of identifiers individually associated with one of a plurality of parties, wherein the contact list is displayed in a first area of the touchscreen in response to changing from a portrait mode to a landscape mode, wherein the contact list is related to the message application, wherein the message application is executed prior to the changing from the portrait mode to the landscape mode;

display a screen in further response to the changing from the portrait mode to the landscape mode, wherein the screen is displayed in a second area of the touchscreen, and wherein the first area is adjacent to the second area, wherein the displaying of the contact list is maintained while the screen is displayed; and display a message history within the second area of the display in response to user selection of a first identifier among the plurality of identifiers of the contact list, wherein the message history comprises messages communicated with the party associated with the first identifier, wherein the displaying of the contact list is maintained while the message history is displayed.

2. The mobile terminal of claim 1, further comprising a sensing unit configured to sense motion of the mobile terminal, wherein the changing to the landscape mode occurs when the sensed motion is rotation in a specific direction.

3. The mobile terminal of claim 1, wherein:

the controller is further configured to:

display another message history within the second area of the display in response to user selection of a second identifier among the plurality of identifiers of the contact list, wherein the another message history comprises messages communicated with the party associated with the second identifier.

4. The mobile terminal of claim 1, wherein the controller is configured to control the display to display the plurality of identifiers of the contact list based on a predetermined condition, the predetermined condition including at least an alphabetical order, a message transmitting/receiving order, a frequency of transmitting/receiving messages, or a party associated with a respective identifier among the plurality of identifiers who is registered as a favorite.

5. The mobile terminal of claim 1, wherein the controller is configured to control the display to:

display the screen in the second area as an empty screen, and display the message history in the second area after selection of the first identifier.

6. The mobile terminal of claim 1, wherein the controller is further configured to:

transmit a selected message of the message history to a party associated with a second identifier among the plurality of identifiers in response to a drag input beginning from the selected message and ending at the second identifier.

7. The mobile terminal of claim 1, wherein a type of the messages of the message history is an instant message, a short message service, a multimedia messaging service, or an e-mail.

8. A method for executing a message application at a mobile terminal having a touchscreen, the method comprising:

displaying on the touchscreen a contact list comprising a plurality of identifiers individually associated with one of a plurality of parties, wherein the contact list is displayed in a first area of the touchscreen in response to changing from a portrait mode to a landscape mode, wherein the contact list is related to the message application, wherein the message application is executed prior to the changing from the portrait mode to the landscape mode;

displaying on the touchscreen a screen in further response to the changing from the portrait mode to the landscape mode, wherein the screen is displayed in a second area of the touchscreen, and wherein the first area is adjacent to the second area, wherein the displaying of the contact list is maintained while the screen is displayed; and displaying on the touchscreen a message history within the second area of the display in response to user selection of a first identifier among the plurality of identifiers of the contact list, wherein the message history comprises messages communicated with the party associated with the first identifier, wherein the displaying of the contact list is maintained while the message history is displayed.

9. The method of claim 8, further comprising:

changing to the landscape mode when the mobile terminal is rotated in a specific direction.

10. The mobile terminal of claim 8, further comprising:

displaying on the touchscreen another message history within the second area of the display in response to user selection of a second identifier among the plurality of identifiers of the contact list, wherein the another message history comprises messages communicated with the party associated with the second identifier.

11. The method of claim 8, further comprising:

displaying on the touchscreen the plurality of identifiers of the contact list based on a predetermined condition, the predetermined condition including at least an alphabetical order, a message transmitting/receiving order, a frequency of transmitting/receiving messages, or a party associated with a respective identifier among the plurality of identifiers who is registered as a favorite.

12. The method of claim 8, further comprising:

displaying on the touchscreen the screen in the second area as an empty screen, and displaying on the touchscreen the message history in the second area after selection of the first identifier.

13. The method of claim 8, further comprising:

transmitting a selected message of the message history to a party associated with a second identifier among the plurality of identifiers in response to a drag input beginning from the selected message and ending at the second identifier.

14. The method of claim 8, wherein a type of the messages of the message history is an instant message, a short message service, a multimedia messaging service, or an e-mail.

15. The mobile terminal of claim 1, wherein the controller is further configured to control the touchscreen to:

display one or more contents in the first area while continuing to display the message history within the second area.

16. The mobile terminal of claim 15, wherein the controller is further configured to:

transmit at least one selected contents among the one or more contents to the party, when the at least one selected contents is dragged and dropped from the first area to the second area.

* * * * *